(12) United States Patent
Awaji et al.

(10) Patent No.: US 11,172,116 B2
(45) Date of Patent: Nov. 9, 2021

(54) DISPLAY APPARATUS, CAMERA APPARATUS, AND METHOD

(71) Applicant: SONY CORPORATION, Tokyo (JP)

(72) Inventors: Masaki Awaji, Kanagawa (JP); Akihiro Nakamura, Kanagawa (JP); Shingo Nakano, Kanagawa (JP); Satoshi Tsubaki, Kanagawa (JP); Tatsuya Ogiwara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/759,557

(22) PCT Filed: Oct. 19, 2018

(86) PCT No.: PCT/JP2018/038956
§ 371 (c)(1),
(2) Date: Apr. 27, 2020

(87) PCT Pub. No.: WO2019/087812
PCT Pub. Date: May 9, 2019

(65) Prior Publication Data
US 2020/0304701 A1    Sep. 24, 2020

(30) Foreign Application Priority Data
Nov. 6, 2017    (JP) .............................. JP2017-213636

(51) Int. Cl.
*H04N 5/232* (2006.01)
*G09F 9/302* (2006.01)
*H04N 5/225* (2006.01)

(52) U.S. Cl.
CPC ......... *H04N 5/23206* (2013.01); *G09F 9/302* (2013.01); *H04N 5/2251* (2013.01)

(58) Field of Classification Search
CPC ............. H04N 5/23206; H04N 5/2251; H04N 5/23225; H04N 5/232933;
(Continued)

(56) References Cited

U.S. PATENT DOCUMENTS

2003/0163716 A1* 8/2003 Robins ............... G08B 13/1418
713/193
2003/0215220 A1* 11/2003 Ohmura .................. H04N 1/603
386/210
(Continued)

FOREIGN PATENT DOCUMENTS

CN    101236613 A    8/2008
CN    101827169 A    9/2010
(Continued)

OTHER PUBLICATIONS

International Search Report and Written Opinion of PCT Application No. PCT/JP2018/038956, dated Jan. 15, 2019, 13 pages of ISRWO.

(Continued)

*Primary Examiner* — Timothy J Henn
(74) *Attorney, Agent, or Firm* — Chip Law Group

(57) ABSTRACT

Implemented is a configuration in which camera identification information is displayed on an electric paper display unit such that the identification information can be confirmed during a power-off time. An electric paper display unit on which camera identification information is displayed, and a control unit that executes displaying upon receiving an input of identification information to be displayed or information for designating the identification information, are included. The control unit receives an input of the identification information or information for designating the identification from an external apparatus, an external memory, or an inner memory of the camera, and displays, on the electric paper display unit, the identification information or synthesized information including the identification information and additional information. Further, an electric paper display module includes a secure memory in
(Continued)

which an option key for defining a process that is executable in the camera apparatus is stored.

20 Claims, 27 Drawing Sheets

(58) Field of Classification Search
CPC .. H04N 5/232411; H04N 5/232; H04N 5/222; H04N 5/225; G09F 9/302
See application file for complete search history.

(56) References Cited

U.S. PATENT DOCUMENTS

2017/0206047 A1* 7/2017 Halterman .............. G09G 3/344
2017/0316760 A1* 11/2017 Wang ....................... G01S 19/13

FOREIGN PATENT DOCUMENTS

| | | |
|---|---|---|
| CN | 102081882 A | 6/2011 |
| JP | 2000-013649 A | 1/2000 |
| JP | 2010-198094 A | 9/2010 |
| TW | 201738856 A | 11/2017 |

OTHER PUBLICATIONS

Office Action for CN Patent Application No. 201880070677.9 dated May 6, 2021, 12 pages of Office Action and 12 pages of English Translation.

* cited by examiner

FIG. 20

| No. | TYPE OF OPTION KEY | OPTION KEY IDENTIFIER | ITEM |
|---|---|---|---|
| 1 | CAMERA OUTPUT PERMISSION FORMAT SETTING KEY | 101 | OUTPUT PERMISSION FORMAT=High Frame Rate (SLOW MOTION) |
| | | 102 | OUTPUT PERMISSION FORMAT=High Dynamic Range (HDR) |
| | | 103 | OUTPUT PERMISSION FORMAT=PsF (FILM SHOOTING, ETC.) |
| | | 104 | OUTPUT PERMISSION FORMAT=4K (HIGH RESOLUTION) |
| | | 105 | OUTPUT PERMISSION FORMAT=8K (HIGH RESOLUTION) |
| 2 | CAMERA CONNECTION PERMISSION CONFIGURATION SETTING KEY | 201 | CONNECTION PERMISSION CONFIGURATION=INTERCONNECTION WITH NEXT-GENERATION CCU/REMOTE CONTROLLER |
| | | 202 | CONNECTION PERMISSION CONFIGURATION=EXCHANGE OF BLOCKS OBTAINED BY DIFFERENT IMAGE PICKUP SENSORS |
| | | 203 | CONNECTION PERMISSION CONFIGURATION=T-CAM (EXTENSION BLOCK OF IMAGE PICKUP SENSOR UNIT) |
| | | 204 | CONNECTION PERMISSION CONFIGURATION=EXCHANGE TO Triax TRANSMISSION BLOCK |
| | | 205 | CONNECTION PERMISSION CONFIGURATION=EXCHANGE TO WIRELESS TRANSMISSION BLOCK |
| | | 206 | CONNECTION PERMISSION CONFIGURATION=EXCHANGE OF Filter Disk Unit |
| 3 | CAMERA EXECUTION PERMISSION FUNCTION SETTING KEY | 301 | EXECUTION PERMISSION FUNCTION=FUNCTION OF TRANSMITTING DATA BETWEEN CAM-CCU AT SPECIFIC WAVELENGTH OR LONGER |
| | | 302 | EXECUTION PERMISSION FUNCTION=MULTICAMERA SYSTEM |
| | | 303 | EXECUTION PERMISSION FUNCTION=ABERRATION CORRECTION FUNCTION (ALAC) |
| | | 304 | EXECUTION PERMISSION FUNCTION=DATA RECORDING FUNCTION |

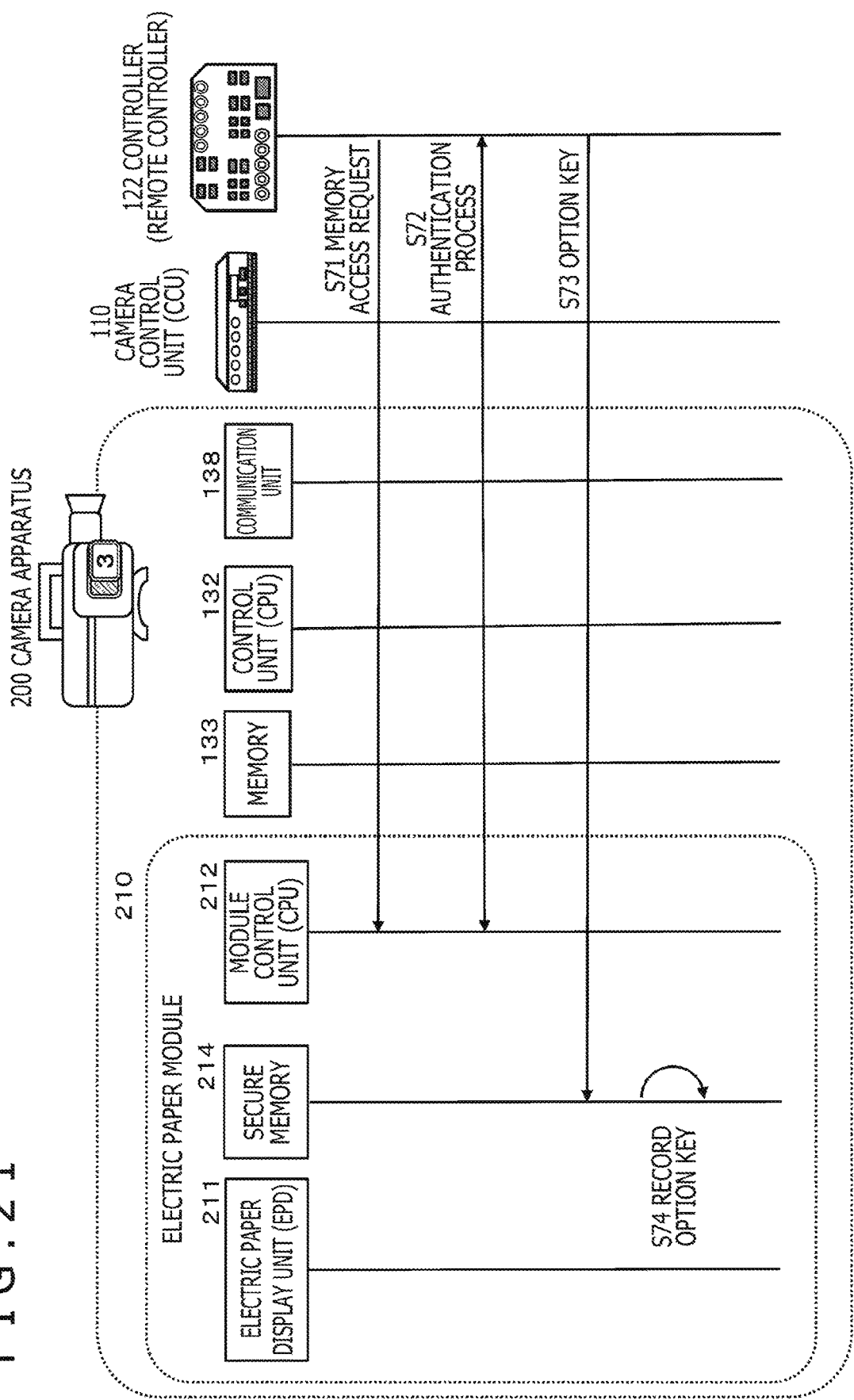

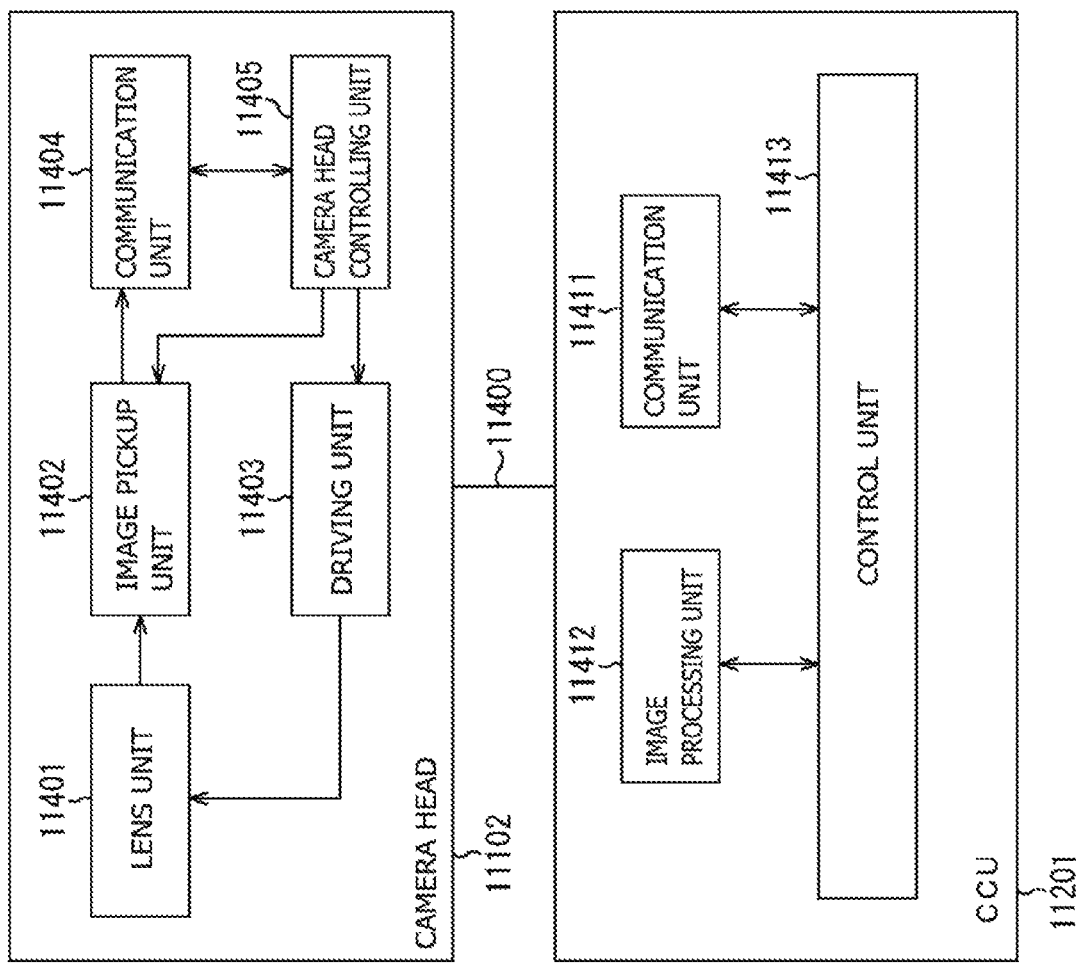

DISPLAY APPARATUS, CAMERA APPARATUS, AND METHOD

CROSS REFERENCE TO RELATED APPLICATIONS

This application is a U.S. National Phase of International Patent Application No. PCT/JP2018/038956 filed on Oct. 19, 2018, which claims priority benefit of Japanese Patent Application No. JP 2017-213636 filed in the Japan Patent Office on Nov. 6, 2017. Each of the above-referenced applications is hereby incorporated herein by reference in its entirety.

TECHNICAL FIELD

The present disclosure relates to a display apparatus, a camera apparatus, a method, and a program. More specifically, the present disclosure relates to a display apparatus, a camera apparatus, a method, and a program by which display of identification information, etc., is performed with use of electric paper.

BACKGROUND ART

For example, broadcasting stations or production companies for producing video content such as broadcasting programs use a number of cameras.

Specifically, in broadcasting of a soccer game in a soccer stadium, cameras need to be arranged at multiple points in the stadium in order to shoot images from various directions.

Moreover, also in shooting of television series or a program in a studio, a number of cameras are used in order to shoot images from various angles.

Images taken by the cameras are transferred to a controller in an editing room via a relay, for example. An editor (operator) selects an optimum image from among the images taken by the cameras, and transmits the selected image through broadcast waves or records the selected image in a recorder.

In such an environment in which a number of cameras are used, respective identifiers (ID) are set for the cameras in order to make each of the cameras identifiable.

Specifically, for example, camera numbers (No.) are used as the identifiers.

For example, in a case where N cameras are used, camera numbers 1 to N are set for the respective cameras so that a process involving assigning camera positions and cameramen in association with the respective camera numbers is executed.

In a common process having been conventionally executed to set respective camera numbers to cameras, for example, paper or plastic plates on which respective camera numbers are recorded, are attached to the corresponding cameras.

That is, camera number recording plates on each of which a camera number (e.g., No. 1 to n) is printed or written by hand, are prepared, and the plates are attached to plate fixing frames of the corresponding cameras.

However, one camera is usually used for shooting various programs, and thus, a camera number therefor needs to be changed each time shooting is carried out.

In addition, cameras that are used by broadcasting stations are extremely expensive, and thus, are not used by one broadcasting station, but are often rented to various content production companies. Also, in some cases, cameras are rented to different broadcasting stations.

In a case where one camera is used by various users as described above, a new user of the camera sets a new camera number each time.

Hence, each user needs to execute a process involving preparing plates on each of which a camera number is recorded, and attaching the plates to corresponding cameras.

This process increases a burden on the user.

It is to be noted that a related art that proposes one configuration to solve this problem is PTL 1 (Japanese Patent Laid-Open No. 2000-013649), for example.

PTL 1 discloses a configuration in which a display unit for displaying camera identification information is provided to a camera, and camera identification information such as a camera number is displayed on the display unit.

However, the display unit disclosed in PTL 1 includes an LED or a liquid crystal display apparatus. Thus, in a case where the camera is turned off, the display disappears.

In a process for installing a number of the cameras at installation positions corresponding to the cameras, or at a preliminary process for connecting cameras to a relay or an editing apparatus, preparations are made with the cameras turned off, in many cases.

Unless the cameras are turned on, the camera identifiers are not displayed on the respective display units including LEDs or liquid crystal display apparatuses. This leads to a problem that work becomes difficult.

CITATION LIST

Patent Literature

[PTL 1]
Japanese Patent Laid-Open No. 2000-013649

SUMMARY

Technical Problem

The present disclosure has been made in view of the aforementioned problem, for example, and an object thereof is to provide a display apparatus, a camera apparatus, a method, and a program by which, even in a state where a camera is off, a camera identifier can be displayed and confirmed with no use of any plate on which an identifier is recorded.

Solution to Problem

A first aspect of the present disclosure is a display apparatus including an electric paper display unit on which identification information regarding a camera apparatus is displayed, and a control unit that controls display of the identification information in accordance with a predetermined operation,
in which the identification information displayed on the display unit is kept displayed, irrespective of power supply to the display unit.

Further, a second aspect of the present disclosure is a camera apparatus including an image pickup unit, an electric paper display unit on which identification information regarding the camera apparatus is displayed, and a control unit that displays the identification information in accordance with a predetermined operation, in which the identification information displayed on the display unit is kept displayed, irrespective of power supply to the display unit.

Further, a third aspect of the present disclosure is an identification information display method which is performed by a display apparatus, the method including generating, by means of a control unit, display information in response to an input of identification information regarding a camera apparatus or designation information corresponding to the identification information, and displaying the generated display information on an electric paper display unit on which display is kept irrespective of power supply.

Further, a fourth aspect of the present disclosure is an information processing method which is performed by a camera apparatus, the camera apparatus being configured to have an electric paper module attached thereto, the electric paper module including an electric paper display unit on which display is kept irrespective of power supply, the method including a step in which a control unit of the camera apparatus executes authentication with respect to the electric paper module, a step in which the control unit acquires an option key from a secure memory of the electric paper module on condition that the authentication is established, and a step in which the control unit executes a process that is permitted on condition that the option key has been acquired.

Further, a fifth aspect of the present disclosure is a program for executing information processing in a camera apparatus, the camera apparatus being configured to have an electric paper module attached thereto, the electric paper module including an electric paper display unit on which display is kept irrespective of power supply, the program including a step of causing a control unit of the camera apparatus to execute authentication with respect to the electric paper module, a step of causing the control unit to acquire an option key from a secure memory of the electric paper module on condition that the authentication is established, and a step of causing the control unit to execute a process that is permitted on condition that the option key has been acquired.

It is to be noted that a program according to the present disclosure can be provided by a recording medium or communication medium for providing the program in a computer readable format to an information processing apparatus or computer system that is capable of executing various program codes, for example. Since the program is provided in a computer readable format, processing in accordance with the program is executed on the information processing apparatus or the computer system.

Other objects, features, and advantages of the present disclosure will become apparent from the detailed description based on embodiments and attached drawings which are described later. Note that, in the present description, a system refers to a logical set structure including a plurality of apparatuses, and the apparatuses of the structure are not necessarily included in the same casing.

Advantageous Effect of Invention

According to one embodiment of the present disclosure, a configuration in which camera identification information is displayed on an electric paper display unit such that the identification information can be confirmed during a power-off time, is implemented.

Specifically, for example, the configuration includes an electric paper display unit that displays camera identification information, and a control unit that executes a display process upon receiving an input of identification information to be displayed or information for designating the identification information. The control unit receives an input of the identification information or information for designating the identification information from an external apparatus, an external memory, or an inner memory of the camera, and displays, on the electric paper display unit, the identification information or synthesized information including the identification information and additional information. In addition, an electric paper display module has a secure memory in which an option key for defining a process that is executable in the camera apparatus is stored.

Accordingly, a configuration in which camera identification information is displayed on an electric paper display unit such that the identification information can be confirmed during a power-off time, is implemented.

It is to be noted that the effect described in the present description are just examples, and thus, are not limited. In addition, any additional effect may be provided.

BRIEF DESCRIPTION OF DRAWINGS

FIG. 20 is a diagram of a specific example of an option key.

FIG. 21 is a diagram of a sequence of recording (writing) an option key into a secure memory of the electric paper module.

FIG. 27 is a block diagram depicting an example of a functional configuration of a camera head and a camera control unit (CCU).

DESCRIPTION OF EMBODIMENTS

Hereinafter, a display apparatus, a camera apparatus, a method, and a program according to the present disclosure will be explained in detail with reference to the drawings. It is to be noted that an explanation will be given in accordance with the following items.

1. Common Configuration Example of Displaying Camera Identifier on Camera Apparatus
2. Configuration Example of Camera Apparatus according to Present Disclosure
3. Connection Configuration Example of Camera Apparatuses
4. Configuration Example of Camera Apparatus
5. Specific Processing Example of Displaying Data on Electric Paper Display Unit
 5-1. (Display Processing Example 1) Processing Example of Displaying Only Camera Identifier (ID) on Electric Paper Display Unit
 5-2. (Display Processing Example 2) Processing Example of Displaying Other Data in Addition to Camera Identifier (ID) on Electric Paper Display Unit
6. Configuration Example of Displaying Data on Electric Paper Display Unit
7. Configuration Example of Electric Paper Module Including Electric Paper Display Unit and Data Processing Unit
8. Example of Application to Endoscopic Surgery System
9. Conclusion of Configuration according to Present Disclosure

[1. Common Configuration Example of Displaying Camera Identifier on Camera Apparatus]

First, a common configuration example of displaying a camera identifier on a camera apparatus will be explained with reference to FIG. 1.

Figure 1:
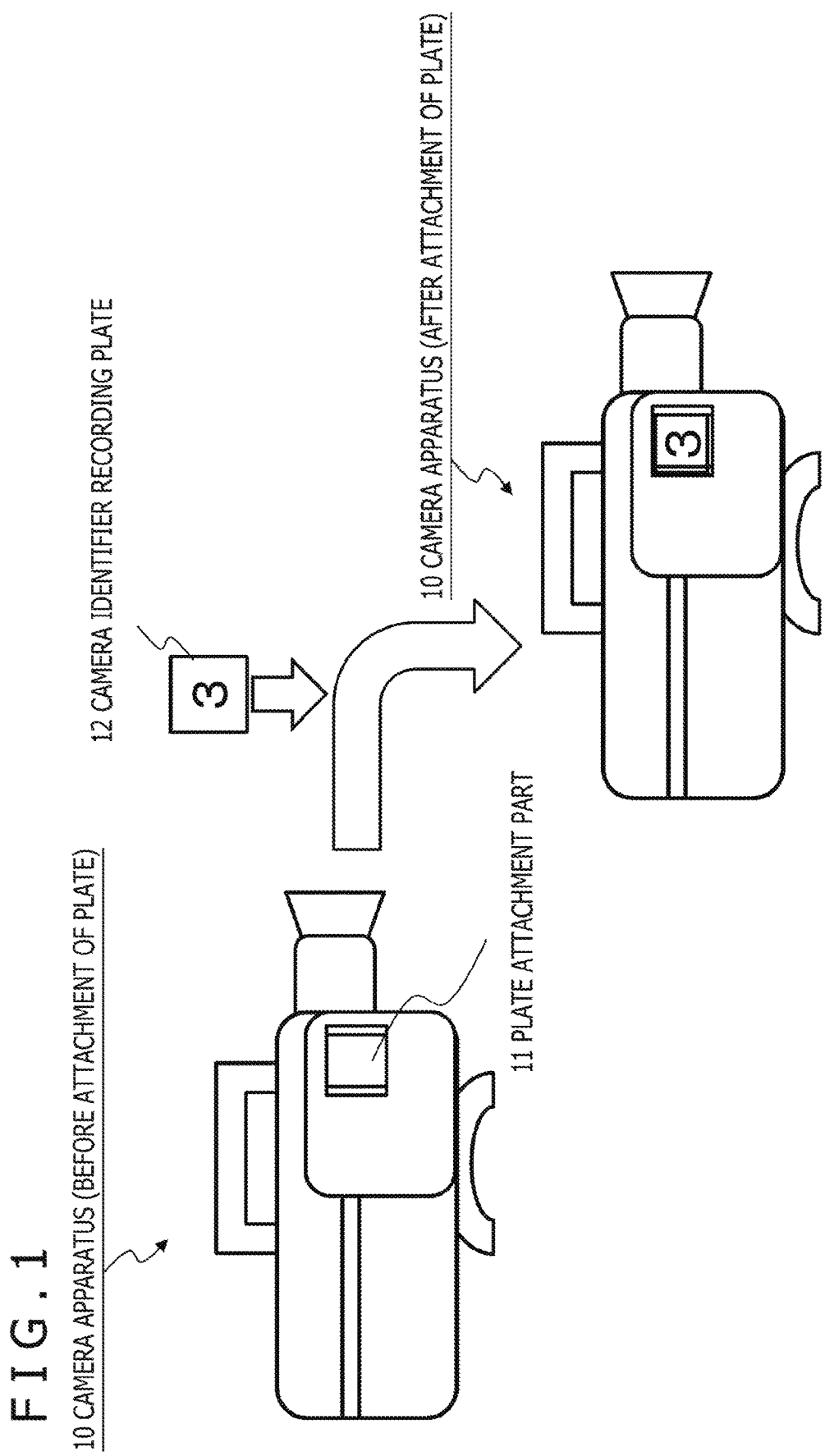
FIG. 1 is a diagram depicting a common configuration example of displaying an identifier on a camera apparatus.

FIG. 1 is a diagram depicting a common configuration example of displaying a camera identifier on a camera apparatus.

A camera apparatus 10 depicted in FIG. 1 is one of a number of cameras (video cameras) which are used by broadcasting stations or production companies for producing video content such as broadcast programs, for example.

As described above, in broadcasting of sports such as broadcasting of a soccer game, cameras need to be arranged at multiple points in a stadium in order to shoot images from various directions. Moreover, also in shooting of television series or a program in a studio, a number of cameras are used in order to shoot images from various angles.

In such an environment in which a number of cameras are used, identifiers (ID) such as camera numbers need to be set for the respective cameras in order to make the cameras identifiable.

FIG. 1 depicts an example that has been conventionally used to set a camera number for each camera. This example has a configuration in which, for example, a paper or plastic plate on which a camera number is recorded, that is, a camera identifier recording plate 12 depicted in FIG. 1 is attached to the camera.

As depicted in the camera apparatus (before attachment of plate) 10 in the upper left part of FIG. 1, a plate attachment part 11 is formed on a side surface of the plate camera apparatus 10.

The camera identifier recording plate 12 is attached to the plate attachment part 11 of the camera apparatus 10, and thus, a camera identifier (camera number)=3 can be set for the camera apparatus 10, as illustrated in the camera apparatus (after attachment of plate) 10 in the lower right part of FIG. 1.

For example, in a case where N cameras are used, camera number recording plates on which respective numbers No. 1 to n are printed or written by hand are prepared, and the plates are attached to the respective plate attachment parts of the corresponding cameras.

As a result of this process, a number of cameras can be identified, arrangement and connection of the cameras can be properly made, and further, communication between an editing room and the respective cameras can be properly performed.

However, cameras are used for shooting of various content such as programs, and are used by various users, as described above. In a case where one camera is used by various users, a new camera user sets a new camera number each time. Each user needs to prepare plates on each of which a camera number is recorded, and attach the plates to corresponding cameras.

This process increases a burden on the user.

In order to solve the aforementioned problem, the present disclosure has a configuration in which necessity to attach the camera identifier recording plate 12 as depicted in FIG. 1 is eliminated.

Hereinafter, a configuration according to the present disclosure will be explained.

[2. Configuration Example of Camera Apparatus According to Present Disclosure]

A configuration example of a camera apparatus according to the present disclosure will be explained with reference to FIGS. 2A, 2B, and 2C and later.

Figure 2:
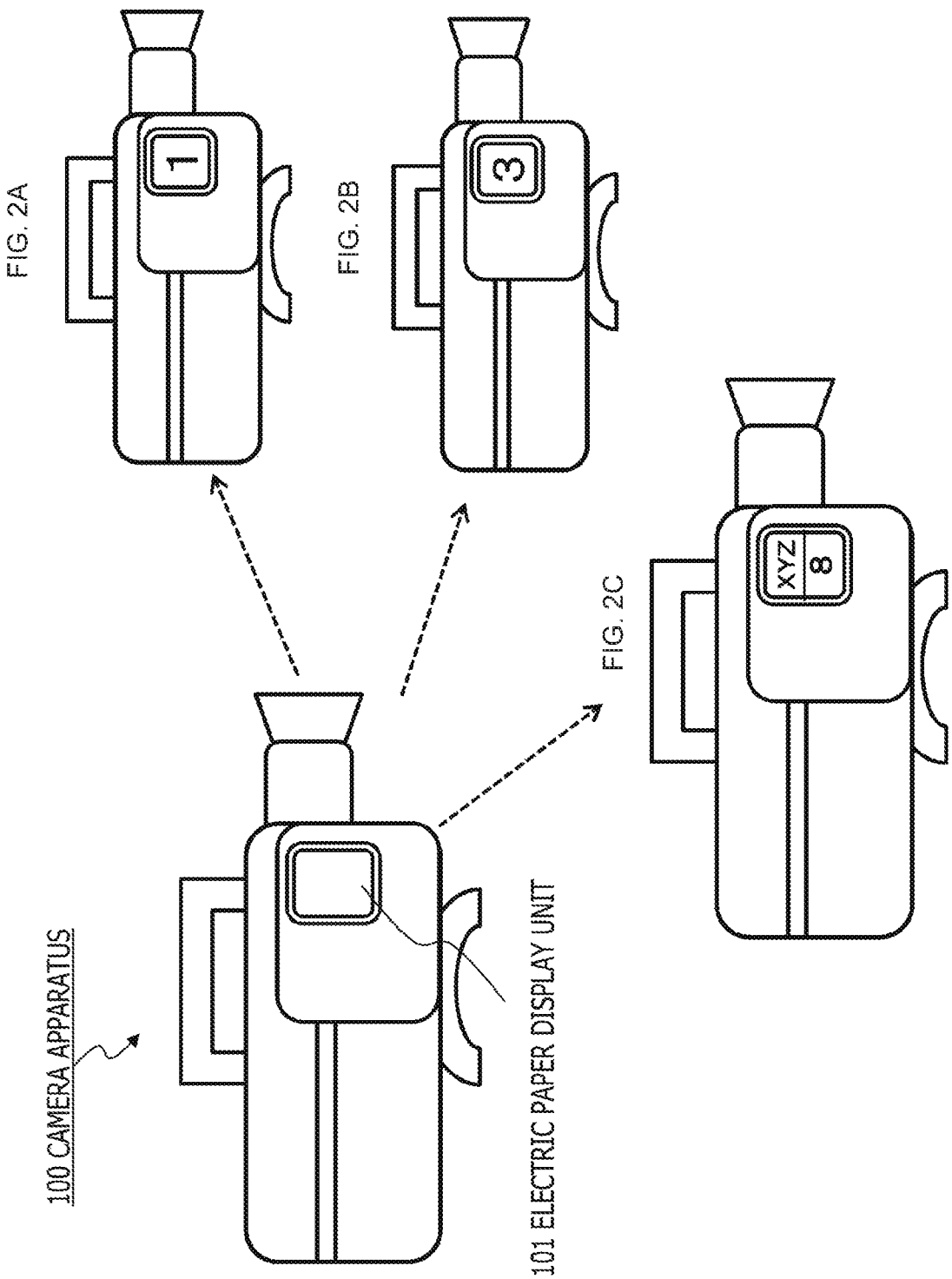
FIGS. 2A, 2B, and 2C are diagrams depicting a configuration example of a camera apparatus according to the present disclosure.

FIGS. 2A, 2B, and 2C are diagrams depicting a configuration example of a camera apparatus 100 according to the present disclosure.

An electric paper display unit 101 is formed on a side surface of the camera apparatus 100 depicted in FIGS. 2A, 2B, and 2C.

The electric paper display unit 101 is a display unit capable of outputting various display information by using electric paper.

It is to be noted that the electric paper is configured to display information by an electrophoretic method, for example. Specifically, microcapsules each storing white particles and black particles are arranged on a display surface, the white particles and the black particles in the microcapsules are moved by electrolysis, the white particles or the black particles are moved to the display surface side of the display unit by units of the microcapsules, whereby data is displayed in white and black.

When the particles in the microcapsules are moved, control based on voltage needs to be performed thereon by units of the microcapsules. After the movement, even when application of voltage is stopped, the particles in the microcapsules are not easily moved. Thus, data display can be continued without continuation of power supply.

That is, once data is displayed on the electric paper display unit, the data is continuously displayed even after power supply to the electric paper is stopped. Accordingly, similarly to a printed matter, data display can be performed without requiring electric power.

To change the displayed data, it is sufficient to supply power to move the particles in the microcapsules according to data to be displayed.

It is to be noted that, besides the aforementioned electrophoretic method, various methods can be used for the electric paper. The electric paper display unit 101 according to the present disclosure is not limited to a particular method. However, a method for enabling continuous display of displayed data on the electric paper display unit 101 after stop of power supply to the electric paper display unit 101, is preferably used.

In FIGS. 2A, 2B, and 2C, three examples FIGS. 2A, 2B, and 2C are depicted as examples of displayed data on the electric paper display unit 101 on a side surface of the camera apparatus 100.

In each of the display examples FIGS. 2A and 2B, a camera number that corresponds to a camera identifier (ID) is displayed on the electric paper display unit 101.

In the display example FIG. 2C, a camera number that corresponds to a camera identifier (ID) is displayed on the lower part of the electric paper display unit 101, and a logo, such as a broadcasting station name logo, representing the name of a company using the camera is displayed on the upper part.

The displayed data on the electric paper display unit 101 is continuously displayed even after the camera apparatus 100 is turned off. Therefore, in a state where the cameras are off, arrangement and connection of the cameras can be properly made while displayed data is confirmed.

Also, the displayed data on the electric paper display unit 101 can be easily switched.

Figure 3:
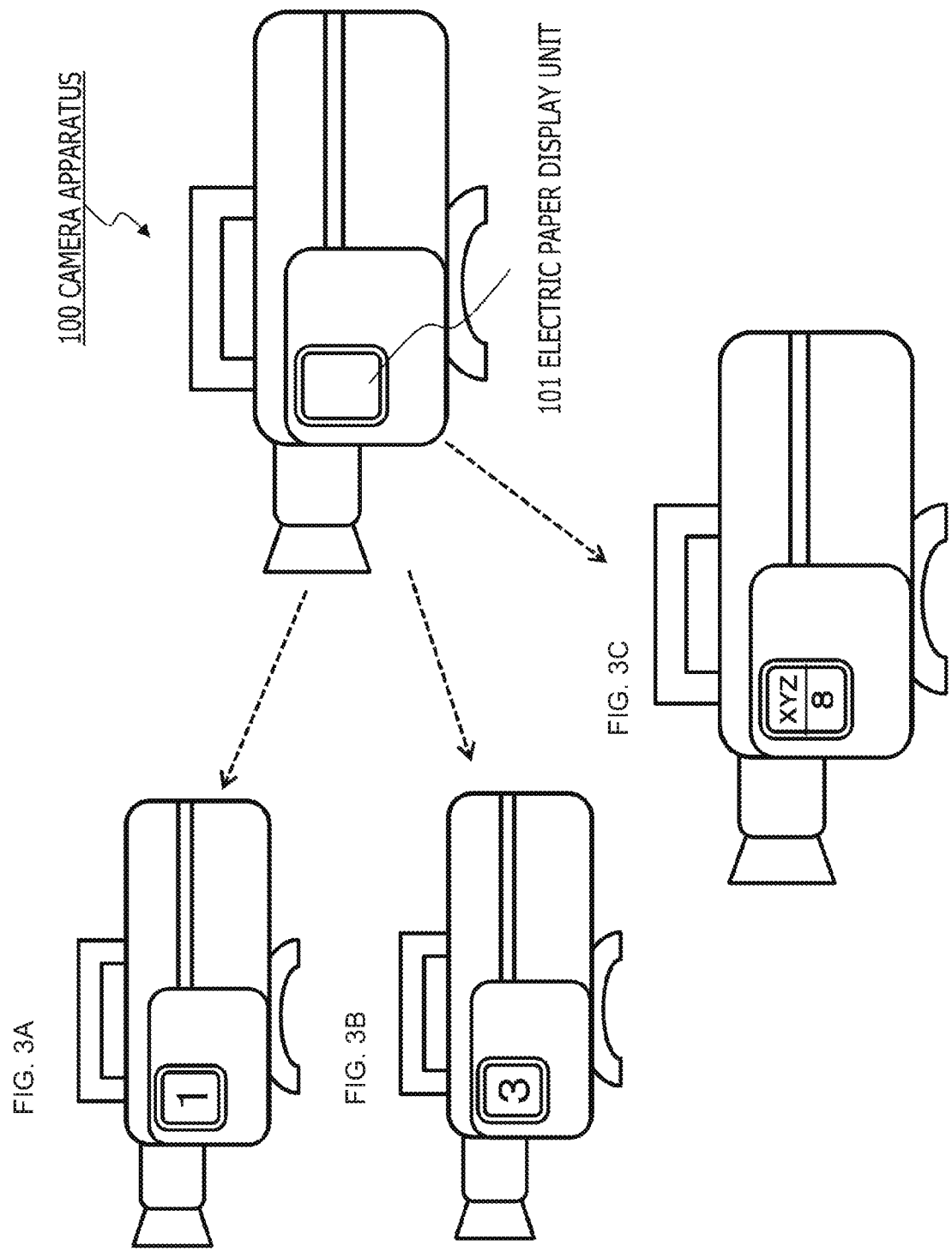
FIGS. 3A, 3B, and 3C are diagrams depicting a configuration example of the camera apparatus according to the present disclosure.

It is to be noted that, in the example depicted in FIGS. 2A, 2B, and 2C, the electric paper display unit 101 is disposed on the right side surface of each of the camera apparatuses 100. However, for example, the electric paper display unit 101 may be disposed on the left side surface of each of the camera apparatuses 100, as depicted in FIGS. 3A, 3B, and 3C. Alternatively, the electric paper display unit 101 may be disposed on the rear surface, the upper surface, or the like of each of the camera apparatuses 100.

It is to be noted that each of the data display examples in FIGS. 2A, 2B, 2C, 3A, 3B, and 3C is merely one example, and thus, multiple different data display examples other than these examples can be offered. Some of the other different data display examples will be explained later.

[3. Connection Configuration Example of Camera Apparatuses]

Next, a connection configuration example of the camera apparatuses 100 each having the electric paper display unit 101 having been explained with reference to FIGS. 2A, 2B, and 2C, will be explained.

Figure 4:
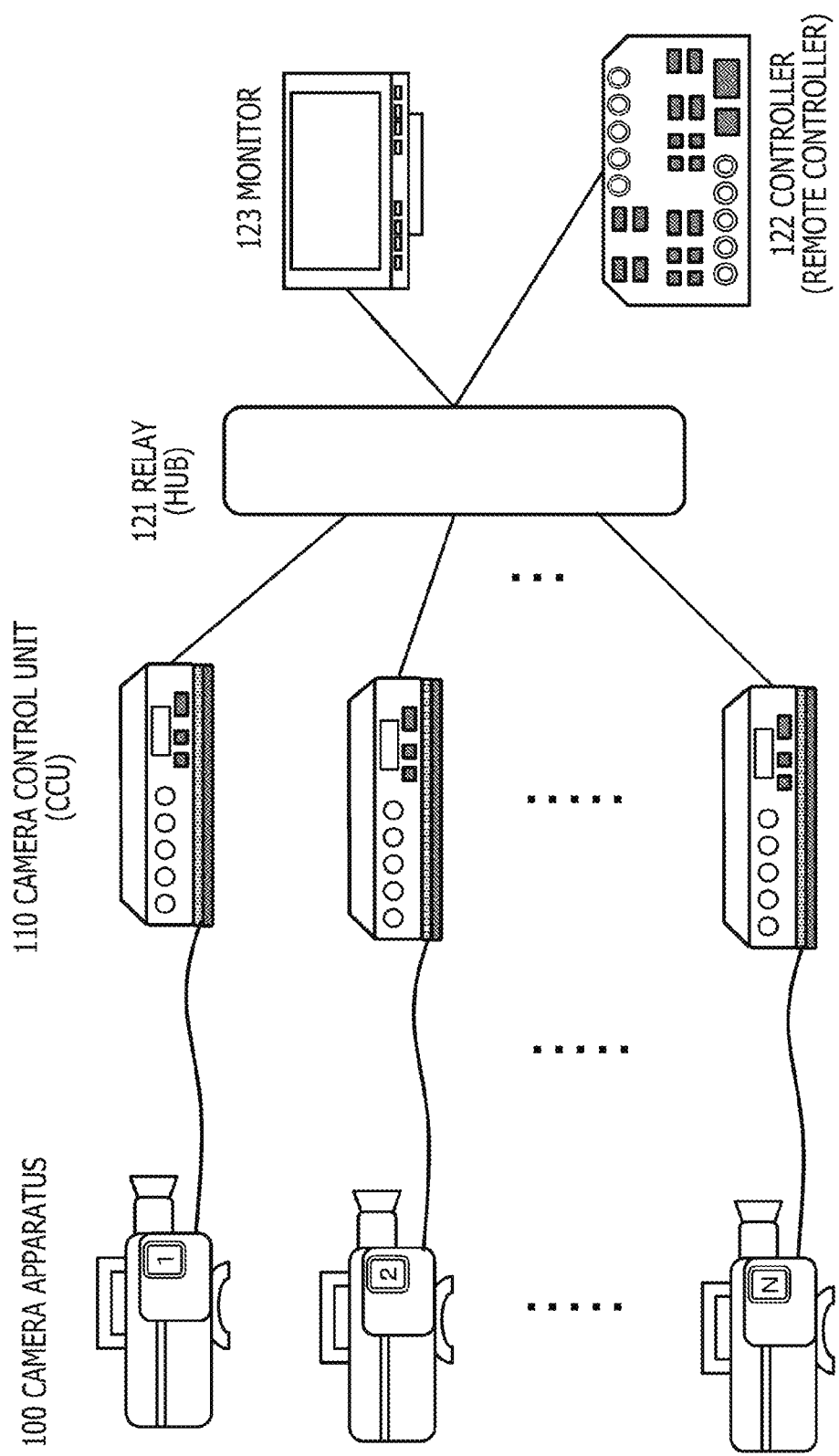
FIG. 4 is a diagram depicting one example of a connection configuration of the camera apparatus.

FIG. 4 is a diagram depicting one example of a connection configuration of the camera apparatuses 100.

For example, each of the camera apparatuses 100 is a video camera which is used by broadcasting stations or production companies for producing video content such as broadcast programs.

In broadcasting of sports or shooting of television series or a program in a studio, a number of camera apparatuses (video cameras) are used in order to shoot different images from various angles.

FIG. 4 depicts one configuration example of a photographing system using N camera apparatuses.

The camera apparatuses 100 are connected to respective camera control units (CCUs) 110 that correspond to camera apparatuses and separately control the camera apparatuses 100.

Images and sound signals acquired by the camera apparatuses 100 are processed in the connected CCUs 110, respectively.

Further, signals outputted from the CCUs 110 are outputted to a controller (remote controller) 122 via a relay (HUB) 121, and, for example, a video selected by the controller (remote controller) 122 side is outputted to a monitor 123. In addition, the video is outputted as broadcasting waves to the outside.

An operator can perform various operations on the controller (remote controller) 122. Also, the controller (remote controller) 122 can output all videos from the cameras connected thereto, to the monitor 123.

In addition, control signals can be separately outputted to the camera apparatuses 100 from the controller (remote controller) 122 such that images to be acquired are controlled, for example.

In the configuration example of the photographing system depicted in FIG. 4, the system components included in the camera apparatuses 100, the CCUs 110, the controller (remote controller) 122, and the monitor 123, are connected by wire with use of cables. However, the system components may be wirelessly connected.

Figure 5:
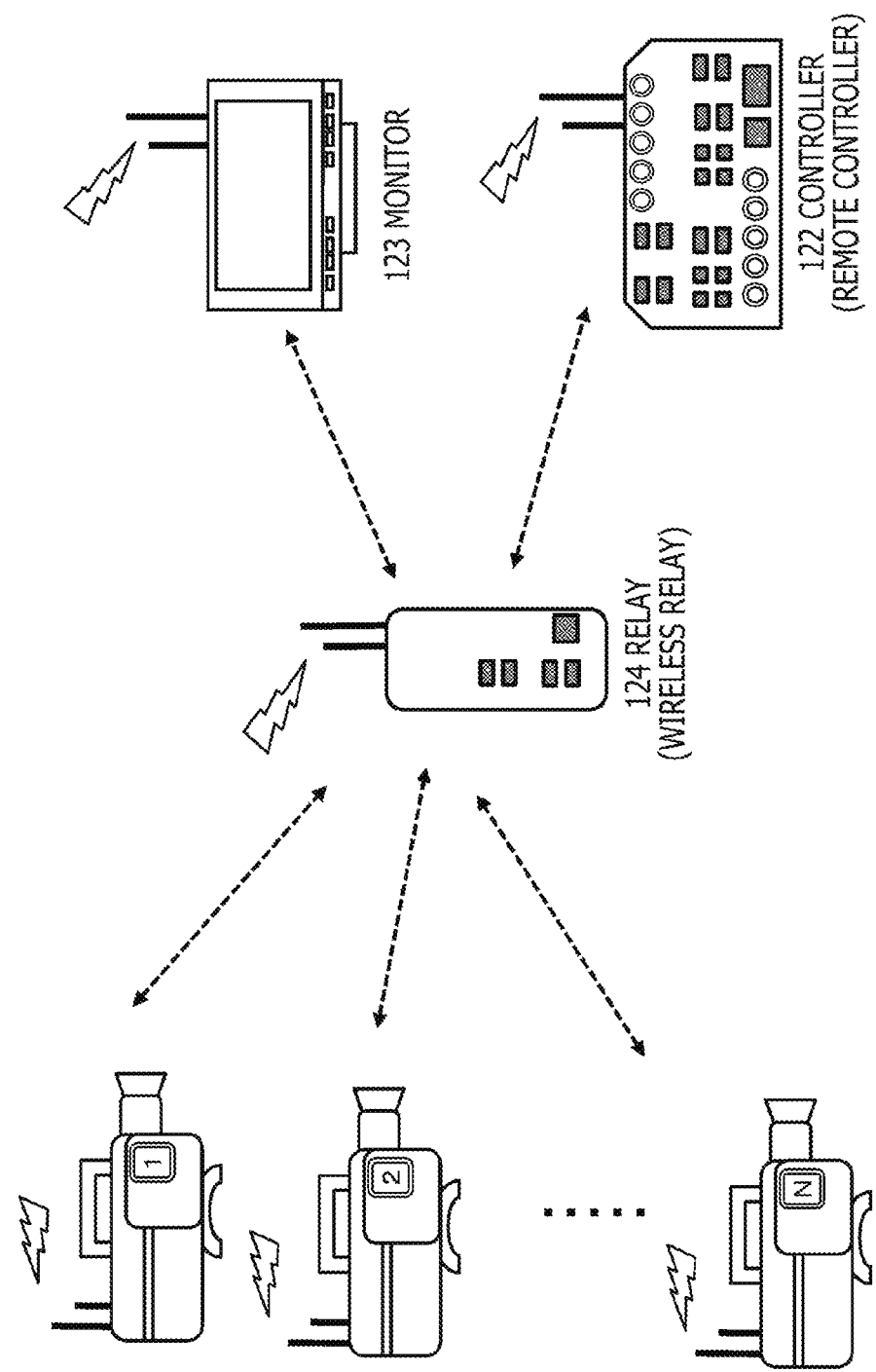
FIG. 5 is a diagram of a configuration example of a photographing system in which camera apparatuses are wirelessly connected.

FIG. 5 depicts a configuration example of a photographing system in which wireless connection is established.

In the configuration example of the photographing system depicted in FIG. 5, the system components such as the camera apparatuses 100, the controller (remote controller) 122, and the monitor 123 are allowed to perform data communication via a relay (wireless relay) 124.

It is to be noted that, in the configuration example depicted in FIG. 5, CCUs that separately control the camera apparatuses 100 are eliminated, and control which is performed by the CCUs 110 having been explained with reference to FIG. 4 is performed by the camera apparatuses 100 themselves or by the controller (remote controller) 122.

A configuration obtained by adding the CCUs 110 corresponding to the camera apparatuses 100 to the configuration depicted in FIG. 5 so as to allow communication between the camera apparatuses 100 and the controller 122 via the CCUs 110, may be adopted.

Figure 6:
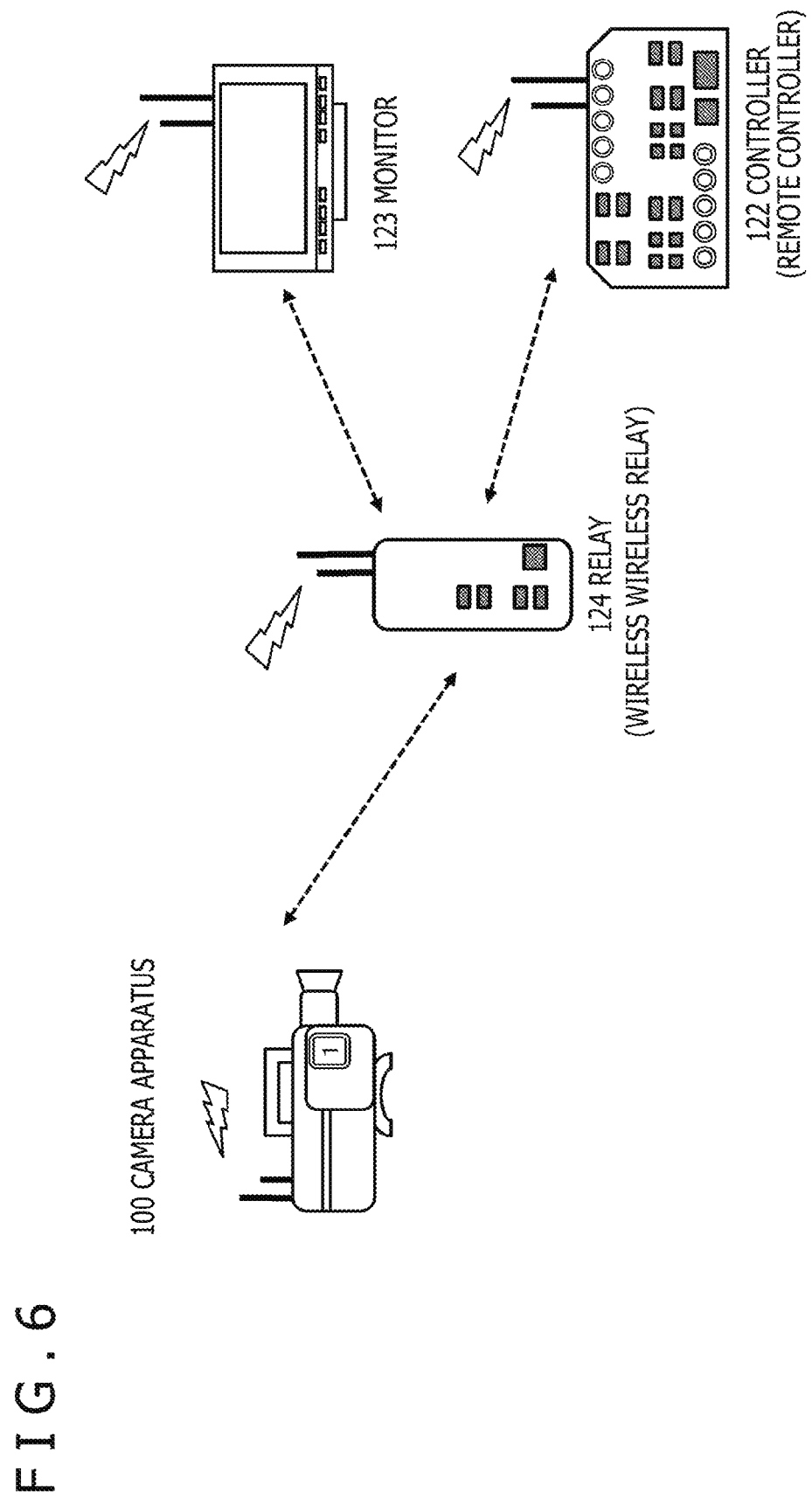
FIG. 6 is a diagram of a configuration example of a photographing system in which one camera apparatus is wirelessly connected.

In each of the configuration examples having been explained with reference to FIGS. 4 and 5, a plurality of the camera apparatuses 100 is set. However, for example, a system configuration including only one camera apparatus 100, as depicted in FIG. 6, may be adopted.

In addition, either wired connection or wireless connection can be adopted among the apparatuses. Also, the wired connection and wireless connection may be adopted in combination.

For example, the camera apparatus 100 and the relay (wireless relay) 124 may be wirelessly connected while the relay (wireless relay) 124, the controller (remote controller) 122, and the monitor 123 may be connected by wire.

[4. Configuration Example of Camera Apparatus]

Next, a configuration example of the camera apparatus 100 will be explained with reference to FIG. 7.

Figure 7:
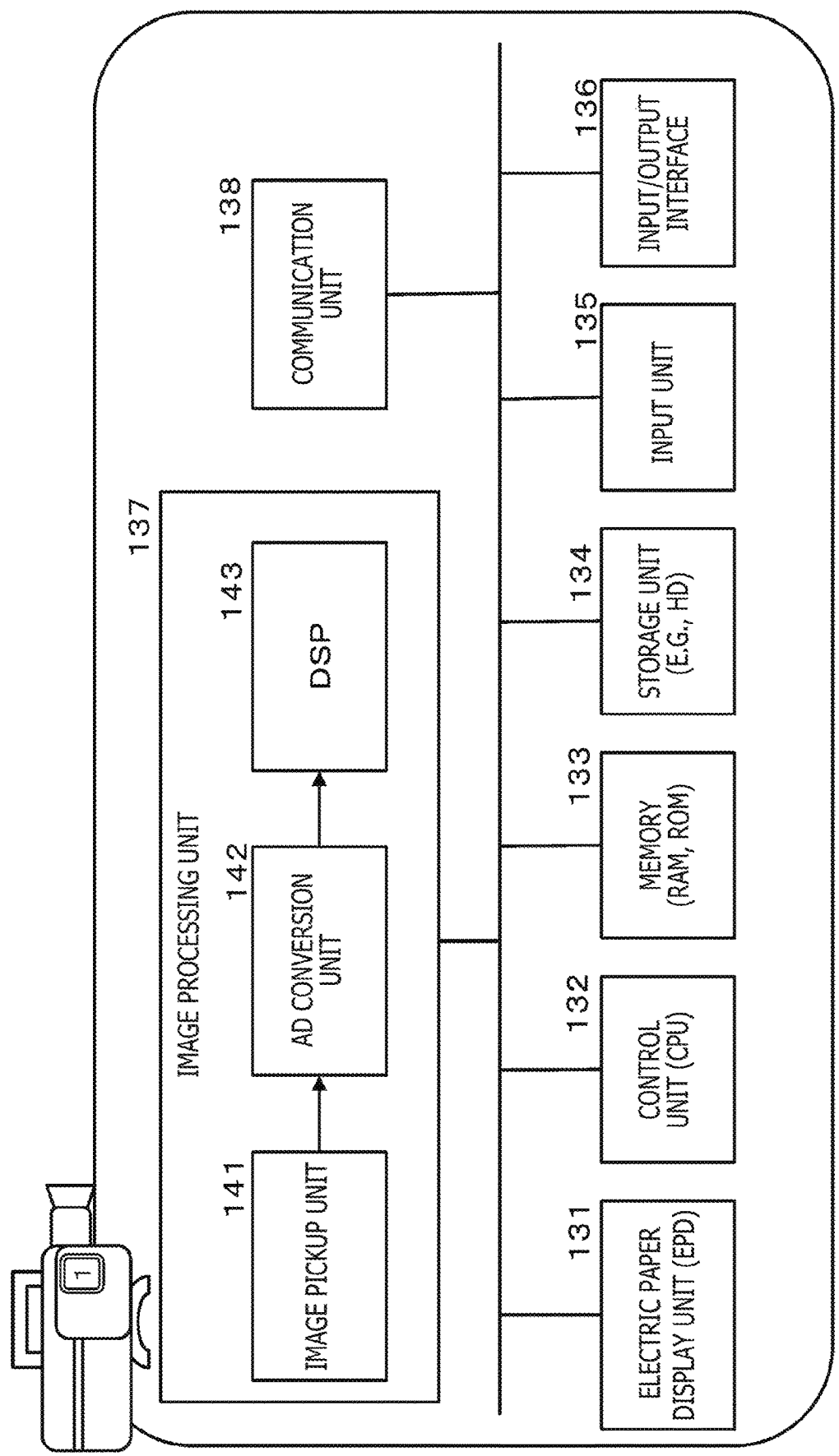
FIG. 7 is a block diagram depicting one configuration example of the camera apparatus.

FIG. 7 is a block diagram depicting one configuration example of the camera apparatus 100.

As depicted in FIG. 7, the camera apparatus 100 includes an electric paper display unit (EPD: Electric Paper Display) 131, a control unit (CPU) 132, a memory (e.g., RAM or ROM) 133, a storage unit (e.g., HD) 134, an input unit 135, an input/output interface 136, an image processing unit 137, and a communication unit 138.

The image processing unit 137 includes an image pickup unit 141, an AD conversion unit 142, and a DSP (Digital Signal Processor) 143.

It is to be noted that, in the configuration example of the camera apparatus 100 depicted in FIG. 7, only main units of the camera apparatus 100 are depicted. Besides the components depicted in FIG. 7, various components such as a sound processing unit, a display on which taken images are confirmed, a battery for supplying power, and a power source switch, are included in the camera apparatus 100.

The electric paper display unit 131 corresponds to the electric paper display unit 101 having been explained with reference to FIGS. 2A, 2B, and 2C.

Specifically, for example, the electric paper display unit 131 is a display unit in which the aforementioned electrophoretic electric paper is used, and on which displayed data can be continuously displayed after stop of power supply although power is needed to change displayed content.

The control unit (CPU) 132 generally controls various processes which are executed in the camera apparatus 100. For example, the control unit (CPU) 132 controls various processes including image shooting, acquisition of sounds, processing of acquired images and sounds, transmission and reception of data via the communication unit 138, and data display on the electric paper display unit 131.

Programs needed for these processes are stored in a memory 133 or a storage unit 134. The control unit (CPU) 132 executes the various processes in accordance with the programs stored in the memory 133 or the storage unit 134.

The memory (e.g., RAM or ROM) 133 stores a program which is executed by the control unit (CPU) 132, a parameter for use in a process which is executed by the control unit (CPU) 132, and the like, and further, is used as a work area for data processing which is executed by the control unit (CPU) 132. In addition, the memory (e.g., RAM or ROM) 133 is also used as a temporary storage area for images and sounds acquired by the camera apparatus 100.

The storage unit (e.g., HD) 134 stores a program which is executed by the control unit (CPU) 132, a parameter for use in a process which is executed by the control unit (CPU) 132, and the like, and is also used as a storage area for images and sounds acquired by the camera apparatus 100.

Also, display data to be displayed on the electric paper display unit 131 is stored in the memory 133 and the storage unit 134.

Specifically, examples of the display data include camera identifier (ID) data, logo data representing a company name, a user name of the camera, an address (e.g., IP address) for use in a communication process which is executed by the camera, an icon, and other various display data.

The input unit 135 is an input unit for inputting information regarding various user's operations such as an input of information to start/stop shooting and a request to rewrite display information on the electric paper display unit 131, for example.

The input/output interface 136 is used for inputting/outputting data to/from external storage means such as a USB memory, an SD memory, or an HDD, or another external apparatus.

The image processing unit 137 includes the image pickup unit 141, the AD conversion unit 142, and the DSP (Digital Signal Processor) 143.

The image pickup unit 141 includes an image pickup element such as a CMOS or a CCD, for example, and outputs an electric signal corresponding to a taken image. The AD conversion unit 142 converts an analog signal inputted from the image pickup unit 141 to a digital signal, and outputs the digital signal to the DSP 143.

The DSP 143 executes data processing on an image signal. For example, the DSP 143 encodes a digital image signal.

An image signal processed by the DSP 143 is transmitted, via the communication unit 138, to an external apparatus such as the CCU 110 or the controller 122 having been explained with reference to FIGS. 4 to 6, for example.

It is to be noted that there has been CMOS sensors with AD converters provided on chips of the sensors themselves. In a case where such an AD converter-provided CMOS sensor is used, an output from the image pickup unit 141 directly to the DSP 143 may be conducted. In the above explanation, the DSP 143 is used as an image processing processor. However, an FPGA (Field-Programmable Gate Array) may be used in place of the DSP 143.

The communication unit 138 transmits/receives data to/from the CCU 110 and the controller 122 having been explained with reference to FIGS. 4 to 6.

Either wired communication using cables or wireless communication is performed, as explained above with reference to FIGS. 4 to 6.

[5. Specific Processing Example of Displaying Data on Electric Paper Display Unit]

Next, a specific processing example of displaying data on the electric paper display unit 131 will be explained with reference to FIG. 8 and later.

An explanation will be given of the following two specific processing examples:

(Display Processing Example 1) a processing example of displaying only a camera identifier (ID) on an electric paper display unit; and (Display Processing Example 2) a processing example of displaying other data in addition to a camera identifier (ID) on an electric paper display unit.

[5-1. (Display Processing Example 1) Processing Example of Displaying Only Camera Identifier (ID) on Electric Paper Display Unit]

First, as the display processing example 1, a processing example of displaying only a camera identifier (ID) on an electric paper display unit will be explained.

Figure 8:
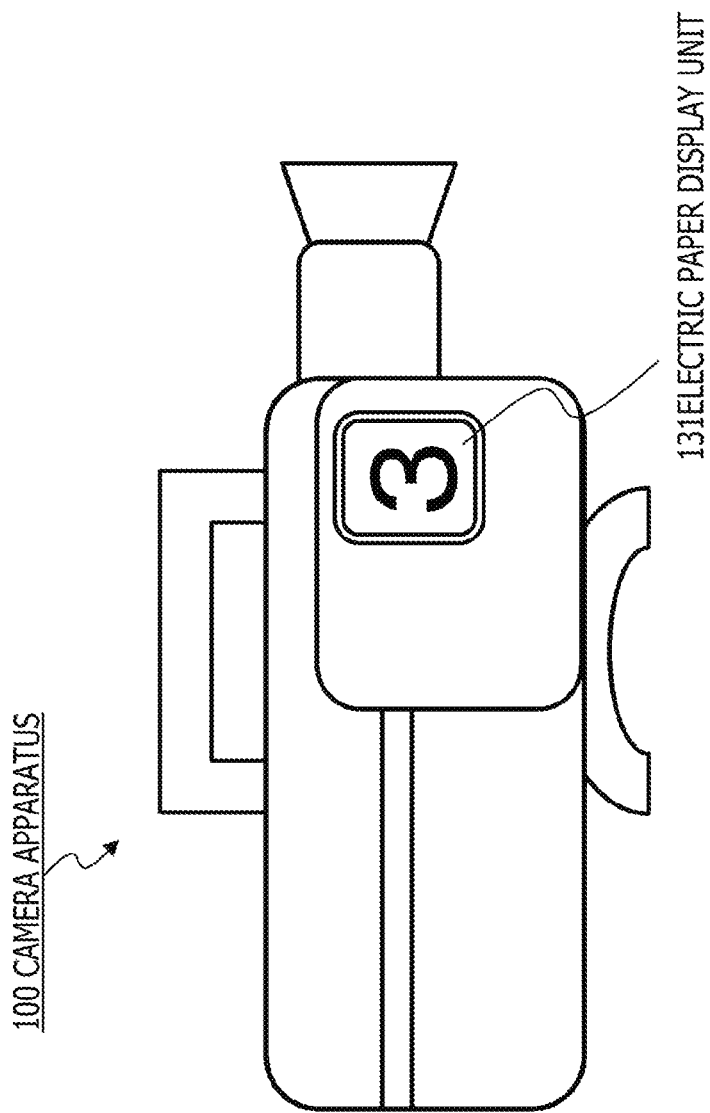
FIG. 8 is a diagram depicting an example in which a camera number as a camera identifier (ID) is displayed on an electric paper display unit of the camera apparatus.

FIG. 8 depicts an example in which a camera number=3 as a camera identifier (ID) is displayed on the electric paper display unit 131 of the camera apparatus 100.

One example of a sequence for displaying a camera identifier (ID) on the electric paper display unit 131 as illustrated in FIG. 8, will be explained with reference to a sequence diagram in FIG. 9.

Figure 9:
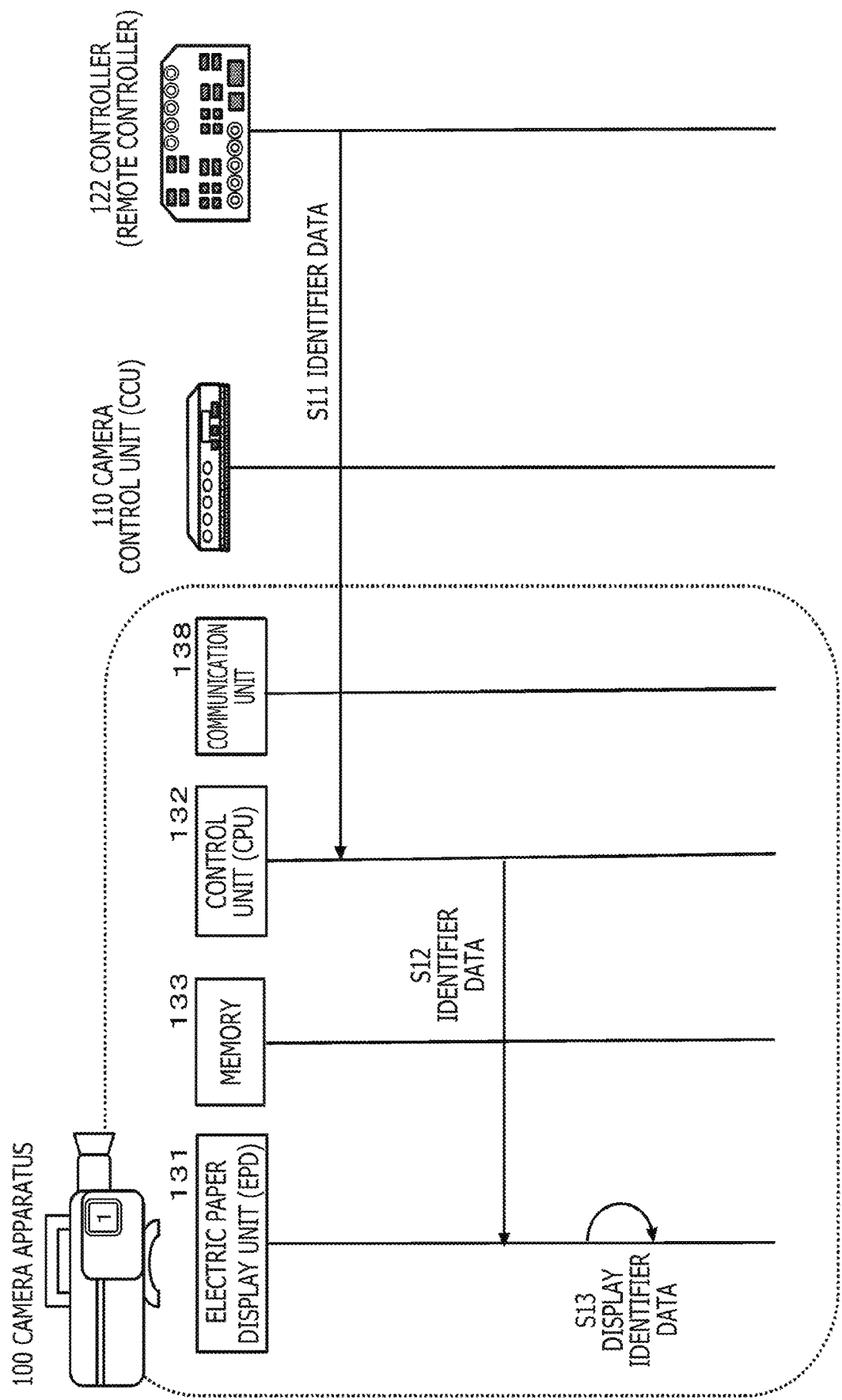
FIG. 9 is a sequence diagram of a process sequence for displaying a camera identifier (ID) on the electric paper display unit.

In FIG. 9, from the left side,
the camera apparatus 100,
the camera control unit (CCU) 110, and
the controller (remote controller) 122 are depicted.

These three apparatuses are configured to be able to communicate with one another by wire or wirelessly.

Furthermore, FIG. 9 depicts, among the internal components of the camera apparatus 100, the following components:
the electric paper display unit 131;
the memory 133;
the control unit 132; and
the communication unit 138.

FIG. 9 depicts one example of a sequence for displaying a camera identifier (ID) on the electric paper display unit 131 of the camera apparatus 100, that is, depicts a process sequence which is executed in a case where the data regarding a camera identifier (ID) to be displayed is transmitted from the controller (remote controller) 122, and is displayed on the electric paper display unit 131 of the camera apparatus 100.

The process proceeds in an order from step S11 to step S13 in FIG. 9. Hereinafter, these steps will be explained.

(Step S11)

First, in step S11, an operator on the controller (remote controller) 122 side determines a camera identifier (ID) to be displayed on the electric paper display unit 131 of the camera apparatus 100, and the controller (remote controller) 122 transmits data (camera identifier data) for displaying the determined camera identifier (ID) to the camera apparatus 100.

In a case where the CCU 110 is present between the controller (remote controller) 122 and the camera apparatus 100, the transmission data from the controller (remote controller) 122 is transmitted to the camera apparatus 100 via the CCU 110.

On the other hand, in a case where no CCU 110 is present between the controller (remote controller) 122 and the camera apparatus 100, the transmission data from the controller (remote controller) 122 is directly transmitted to the camera apparatus 100 not via the CCU 110.

It is to be noted that the data which is for displaying a camera identifier (ID) and which is transmitted from the controller (remote controller) 122, that is, the camera identifier data is either image data (font data) regarding the determined camera identifier (ID), or data for designating the camera identifier (ID).

A process for outputting image data (font data) regarding the camera identifier (ID) is executed as follows.

For example, in order to display a camera number=3 in FIG. 8, image data (font data) regarding "3" to be displayed is outputted from the controller (remote controller) 122.

On the other hand, in a case where data for designating the camera identifier (ID) is outputted, image data (font data) for display is stored in the memory 133 of the camera apparatus 100.

In this case, the controller (remote controller) 122 outputs, from the controller (remote controller) 122, data for designating "3" to be displayed.

(Step S12)

The transmission data from the controller (remote controller) 122 is inputted to the control unit 132 via the communication unit 138 of the camera apparatus 100.

In accordance with the data received from the controller (remote controller) 122, the control unit 132 executes a process for displaying the camera identifier (ID) on the electric paper display unit 131.

In a case where image data (font data) regarding the camera identifier (ID) is received from the controller (remote controller) 122, a process for displaying the image data (font data) on the electric paper display unit 131 is executed.

On the other hand, in a case where data for designating the camera identifier (ID) is received from the controller (remote controller) 122, image data (font data) regarding the camera identifier (ID) corresponding to the designation data is acquired from the memory 133, and a process for displaying the acquired image data (font data) on the electric paper display unit 131 is executed.

(Step S13)

Step S13 is a process for displaying the camera identifier (ID) at the electric paper display unit 131.

Under control of the control unit 132, the camera identifier (ID) is displayed on the electric paper display unit 131.

Specifically, for example, the camera identifier (ID)=3 in FIG. 8 is displayed.

It is to be noted that, during execution of the processes in FIG. 9, the camera apparatus 100 needs to be turned on to supply power to the respective components in the camera apparatus 100, but, once step S13 is completed, that is, once the camera identifier (ID) is displayed on the electric paper display unit 131, the camera identifier (ID)=3 is continuously displayed on the electric paper display unit 131 even after the camera apparatus 100 is turned off.

In the process sequence having been explained with reference to FIG. 9, the process of displaying a camera identifier (ID) on the electric paper display unit 131 of the camera apparatus 100 is executed by the controller (remote controller) 122 side.

Alternatively, the process of displaying a camera identifier (ID) on the electric paper display unit 131 of the camera apparatus 100 may be executed by the camera apparatus 100 side alone without communication between the camera apparatus 100 and another apparatus.

An example in which the process of displaying a camera identifier (ID) on the electric paper display unit 131 is executed by the camera apparatus 100 side alone, will be explained with reference to FIG. 10 and later.

Figure 10:
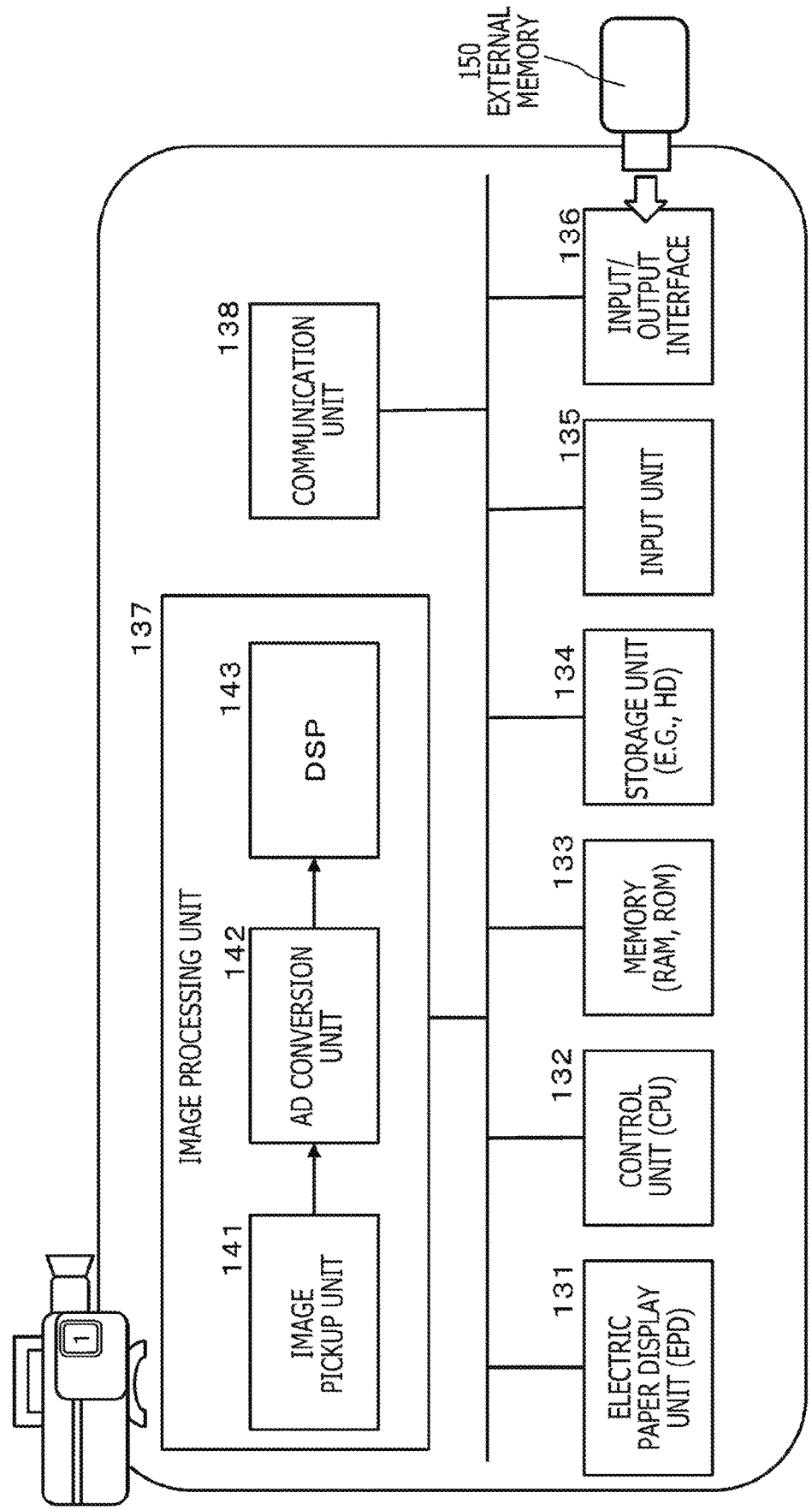
FIG. 10 is a block diagram depicting a configuration example of the camera apparatus with an external 00 memory connected thereto.

FIG. 10 depicts a configuration diagram of the camera apparatus 100, similar to that having been explained above with reference to FIG. 7.

FIG. 10 depicts an example in which an external memory 150 such as a USB memory is connected to the input/output interface 136 of the camera apparatus 100.

Camera identifier data to be displayed on the electric paper display unit 131 of the camera apparatus 100 is stored in the external memory 150.

The camera identifier data is either image data (font data) regarding a camera identifier (ID), or data for designating the camera identifier (ID).

An example of a process of storing the camera identifier data in the external memory 150, reading out the camera identifier data from the external memory 150, and displaying the camera identifier data on the electric paper display unit 131 of the camera apparatus 100, will be explained below.

It is to be noted that the external memory 150 is not limited to USB memories, and various storage means such as an SD memory or an HDD can be used therefor.

A sequence of reading out camera identifier data stored in the external memory 150, and displaying the camera identifier data on the electric paper display unit 131 will be explained with reference to a sequence diagram depicted in FIG. 11.

Figure 11:
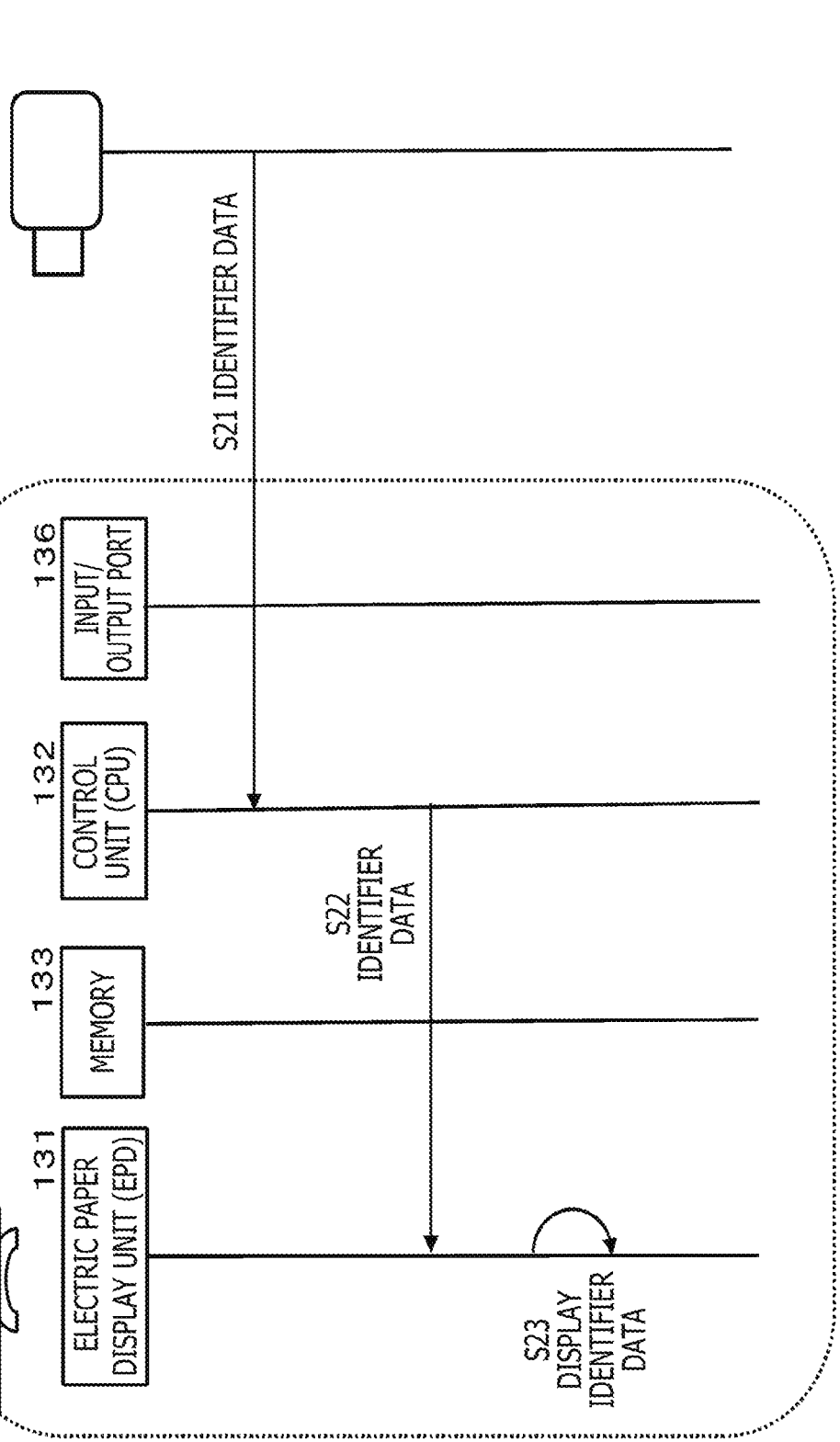
FIG. 11 is a sequence diagram of a sequence for reading out camera identifier data stored in an external memory, and displaying the data on the electric paper display unit.

FIG. 11 depicts, among the internal components of the camera apparatus 100, the following components:

the electric paper display unit 131;
the memory 133;
the control unit 132; and
the input/output port 136.

The external memory 150 connected to the input/output port 136 of the camera apparatus 100 is further depicted in FIG. 11.

The process proceeds in an order from step S21 to step S23 in FIG. 11. Hereinafter, these steps will be explained.

(Step S21)

First, in step S21, the control unit 132 of the camera apparatus 100 reads out camera identifier data from the external memory 150 connected to the input/output port 136 of the camera apparatus 100.

(Step S22)

Next, in step S22, the control unit 132 executes a process for displaying a camera identifier (ID) on the electric paper display unit 131 in accordance with the data read out from the external memory 150.

In a case where image data (font data) regarding a camera identifier (ID) is read out from the external memory 150, a process for displaying the image data (font data) on the electric paper display unit 131 is executed.

On the other hand, in a case where data for designating a camera identifier (ID) is read out from the external memory 150, image data (font data) regarding a camera identifier (ID) corresponding to the designation data is acquired from the memory 133, and a process for displaying the acquired image data (font data) on the electric paper display unit 131 is executed.

(Step S23)

Step S23 is a process for displaying the camera identifier (ID) at the electric paper display unit 131.

Under control of the control unit 132, the camera identifier (ID) is displayed on the electric paper display unit 131.

Specifically, for example, the camera identifier (ID)=3 in FIG. 8 is displayed.

It is to be noted that, during execution of the processes in FIG. 11, the camera apparatus 100 needs to be turned on to supply power to the respective components in the camera apparatus 100, but, once step S23 is completed, that is, once the camera identifier (ID) is displayed on the electric paper display unit 131, the camera identifier (ID)=3 is continuously displayed on the electric paper display unit 131 even after the camera apparatus 100 is turned off.

Alternatively, identification data may be stored in an inner memory of the camera apparatus 100 such as the memory 133 or the storage unit 134 included in components of the camera apparatus 100 depicted in FIG. 7, for example, with no use of the external memory 150 or the like, and the identification data may be read out and be displayed on the electric paper display unit 131.

A process sequence for executing this process will be explained with reference to FIG. 12.

Figure 12:
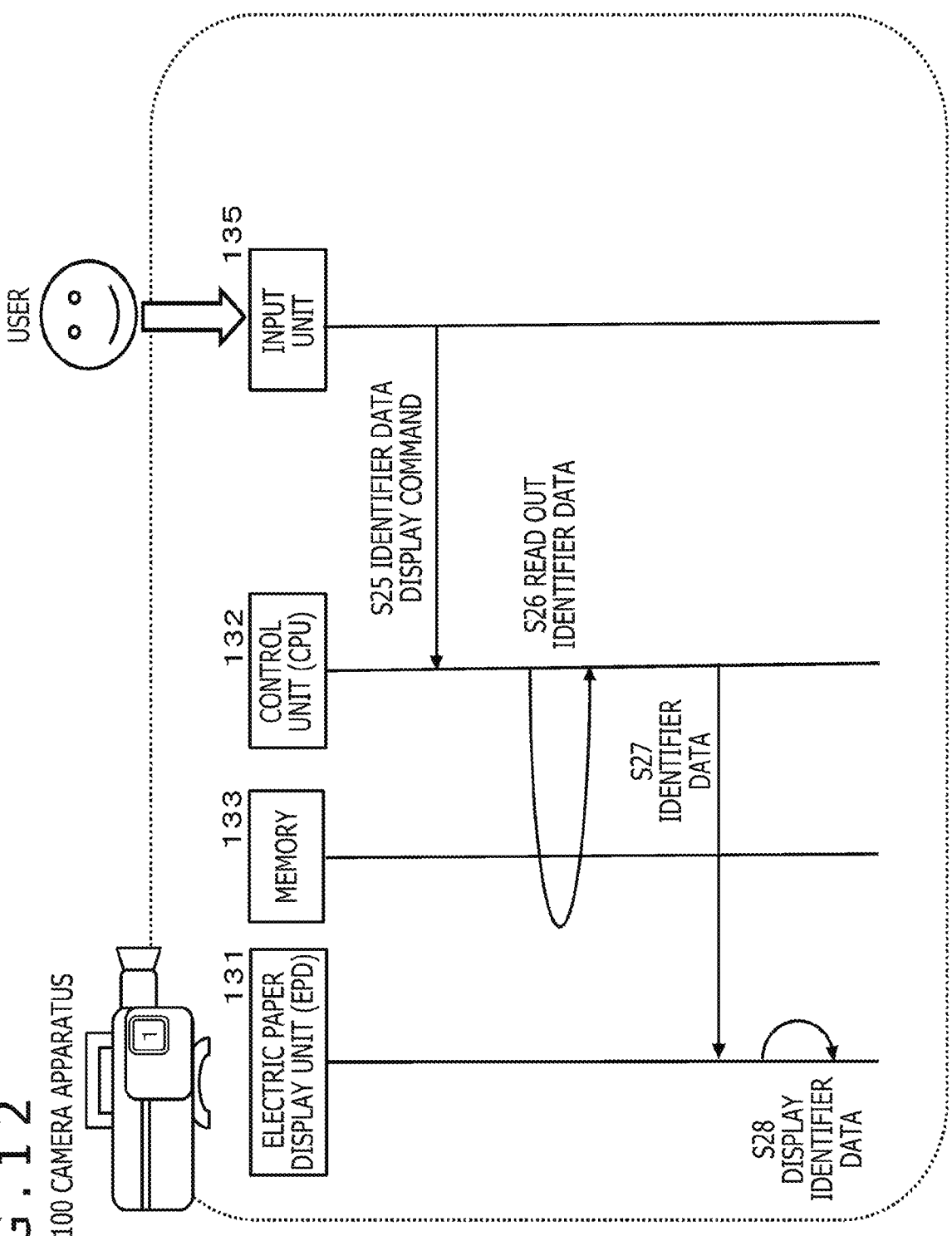
FIG. 12 is a sequence diagram of a sequence for reading out identification data from an inner memory of the camera apparatus, and displaying the data on the electric paper display unit.

FIG. 12 depicts, among the internal components of the camera apparatus 100, the following components:

the electric paper display unit 131;
the memory 133;
the control unit 132; and
the input unit 135.

It is to be noted that the memory 133 in the sequence diagram in FIG. 12 can be replaced with the storage unit 134.

FIG. 12 further depicts a user who executes inputting to the input unit 135 of the camera apparatus 100.

For example, the user is a cameraman or the like using the camera apparatus 100.

The process proceeds in an order from step S25 to step S28 in FIG. 12. Hereinafter, these steps will be explained.

(Step S25)

First, in step S25, the user inputs, to the input unit 135 of the camera apparatus 100, a command (identifier data display command) which is a request to display an identifier (ID) on the electric paper display unit 131.

(Step S26)

Next, in step S26, the control unit 132 acquires, from the memory 133, image data (font data) regarding a camera identifier (ID) with respect to the electric paper display unit 131 in accordance with the command inputted from the input unit 135.

The image data (font data) regarding the camera identifier (ID) is preliminarily stored in the memory 133.

The control unit 132 acquires the image data (font data) regarding the camera identifier (ID) from the memory 133.

(Step S27)

Next, the control unit 132 executes a process for displaying, on the electric paper display unit 131, the image data (font data) regarding the camera identifier (ID) acquired from the memory 133.

(Step S28)

Step S28 is a process for displaying the camera identifier (ID) at the electric paper display unit 131.

Under control of the control unit 132, the camera identifier (ID) is displayed on the electric paper display unit 131.

Specifically, for example, the camera identifier (ID)=3 in FIG. 8 is displayed.

It is to be noted that, during execution of the processes in FIG. 12, the camera apparatus 100 needs to be turned on to supply power to the respective components in the camera apparatus 100, but, once step S28 is completed, that is, once the camera identifier (ID) is displayed on the electric paper display unit 131, the camera identifier (ID)=3 is continuously displayed on the electric paper display unit 131 even after the camera apparatus 100 is turned off.

[5-2. (Display Processing Example 2) Processing Example of Displaying Other Data in Addition to Camera Identifier (ID) on Electric Paper Display Unit]

Next, as the display processing example 2, a process example in which, in addition to a camera identifier (ID), other data is displayed on an electric paper display unit, will be explained.

Figure 13:
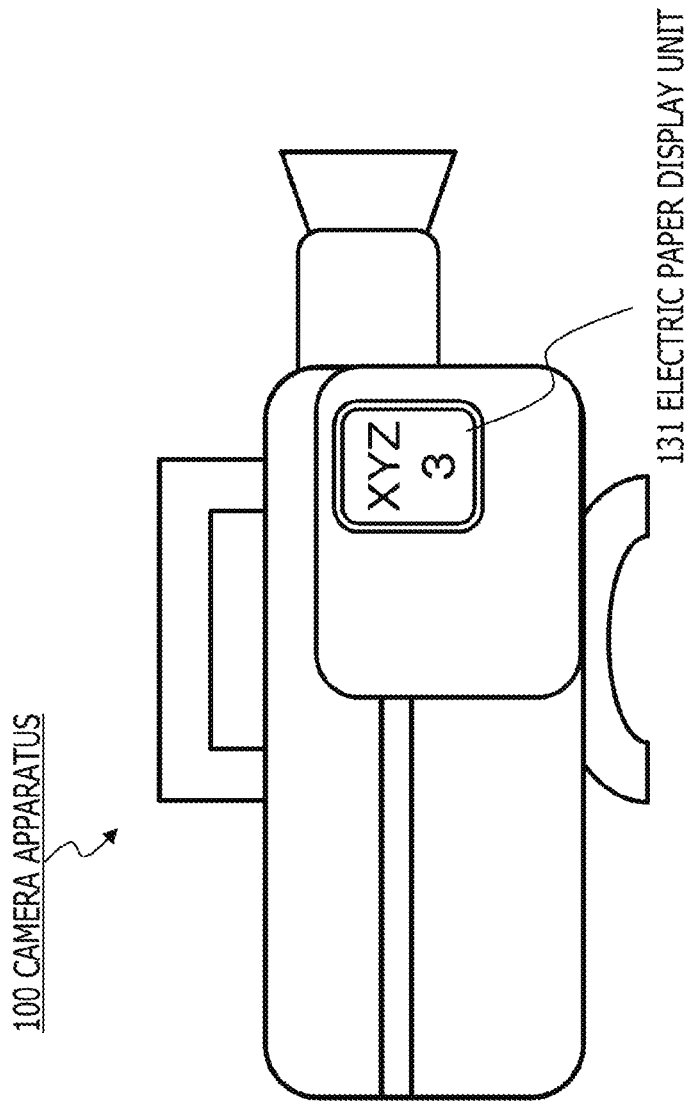
FIG. 13 is a diagram of an example in which a camera identifier (ID) and additional data such as the name of a company using the camera apparatus are displayed together on the electric paper display unit of the camera apparatus.

FIG. 13 depicts an example in which a camera number=3 as a camera identifier (ID), and the name of a company using the camera apparatus 100, for example, a logo mark=XYZ representing a broadcasting station are displayed on the electric paper display unit 131 of the camera apparatus 100.

Thus, not only a camera identifier (ID) but also various data can be displayed on the electric paper display unit 131.

One example of a process sequence for displaying other additional data in addition to a camera identifier (ID) on the electric paper display unit 131 as depicted in FIG. 13, will be explained with reference to a sequence diagram in FIG. 14.

Figure 14:
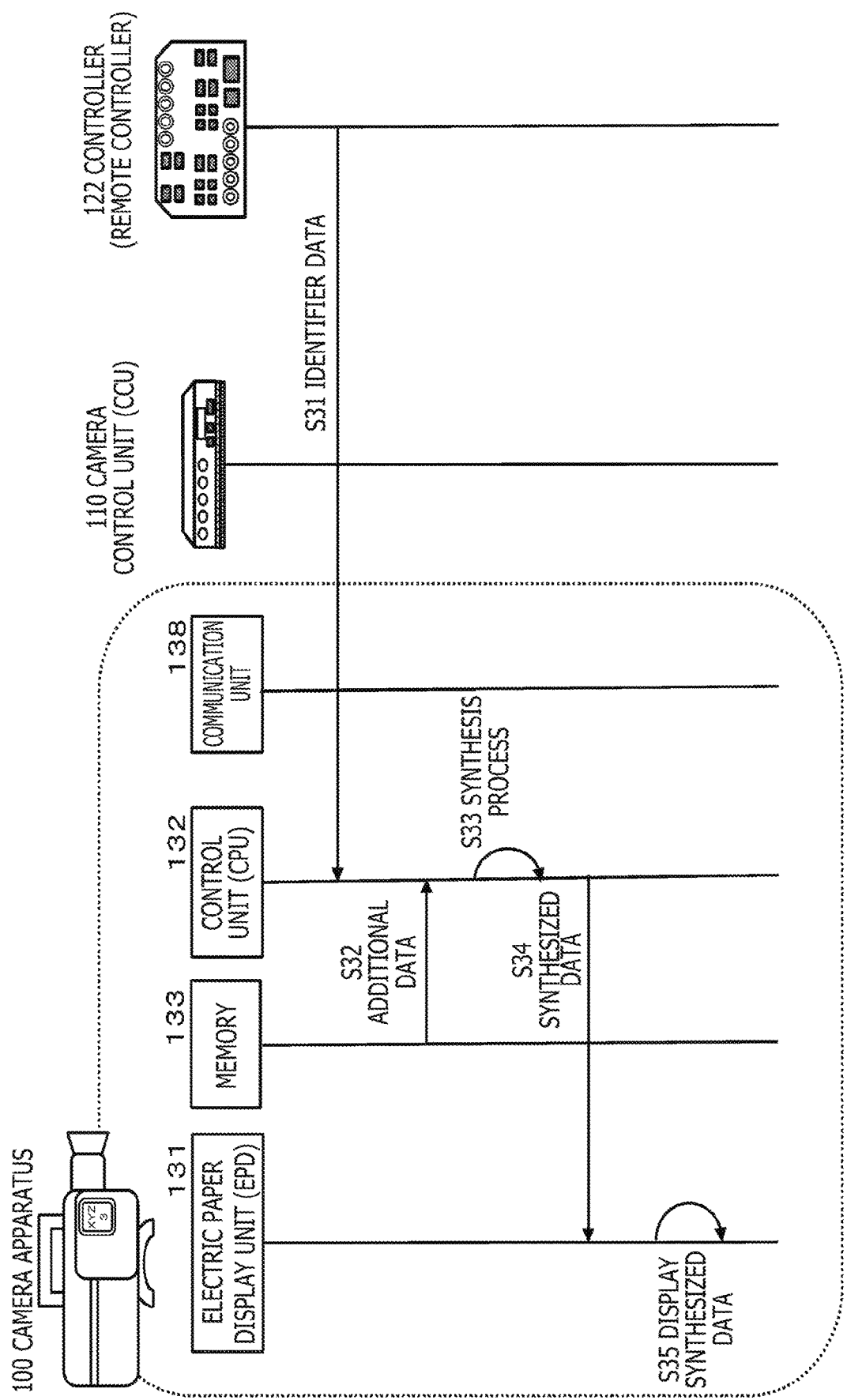
FIG. 14 is a diagram of a process sequence for displaying a camera identifier (ID) and other additional data together on the electric paper display unit.

In FIG. 14, from the left side,
the camera apparatus 100,
the camera control unit (CCU) 110, and
the controller (remote controller) 122 are depicted.

These three apparatuses are configured to be able to communicate with one another by wire or wirelessly.

Further, FIG. 14 depicts, among the internal components of the camera apparatus 100, the following components:
the electric paper display unit 131;
the memory 133;
the control unit 132; and
the communication unit 138.

The sequence diagram in FIG. 14 is one example of a sequence for displaying additional data such as a broadcasting station logo mark representing the name of a broadcasting station in addition to a camera identifier (ID) on the electric paper display unit 131 of the camera apparatus 100.

In this process sequence, the control unit 132 of the camera apparatus 100 executes a display process on the electric paper display unit 131 by executing a synthesis process of the following two types of data:

(Data 1) camera identifier (ID) data transmitted from the controller (remote controller) 122; and (Data 2) additional data (e.g., a broadcasting station logo mark) stored in the memory 133.

The process proceeds in an order from step S31 to step S35 in FIG. 14. Hereinafter, these steps will be explained.

(Step S31)

First, in step S31, an operator on the controller (remote controller) 122 side determines a camera identifier (ID) to be displayed on the electric paper display unit 131 of the camera apparatus 100, and the controller (remote controller) 122 transmits data (camera identifier data) for displaying the determined camera identifier (ID) to the camera apparatus 100.

In a case where the CCU 110 is present between the controller (remote controller) 122 and the camera apparatus 100, the transmission data from the controller (remote controller) 122 is transmitted to the camera apparatus 100 via the CCU 110.

On the other hand, in a case where no CCU 110 is present between the controller (remote controller) 122 and the camera apparatus 100, the transmission data from the controller (remote controller) 122 is directly transmitted to the camera apparatus 100 not via the CCU 110.

It is to be noted that the data which is for displaying a camera identifier (ID) and which is transmitted from the controller (remote controller) 122, that is, camera identifier data is either
image data (font data) regarding the determined camera identifier (ID), or
data for designating the camera identifier (ID), as in the aforementioned example.

The transmission data from the controller (remote controller) 122 is inputted to the control unit 132 via the communication unit 138 of the camera apparatus 100.

(Step S32)

Next, in step S32, the control unit 132 acquires additional data from the memory 133.

That is, the control unit 132 acquires, from the memory 133, additional data such as a broadcasting station logo mark to be displayed in addition to the camera identifier (ID).

It is to be noted that the additional data does not need to be acquired from the memory 133, and may be acquired from the storage unit 134 or the external memory 150.

(Step S33)

Next, in step S33, the control unit 132 executes a synthesis process of the following two types of data:

(Data 1) data regarding a camera identifier (ID) received from the controller (remote controller) 122; and (Data 2) additional data (e.g., a broadcasting station logo mark) acquired from the memory 133.

By synthesizing these two types of data, the control unit 132 generates data to be displayed on the electric paper display unit 131.

It is to be noted that, in a case where image data (font data) regarding a camera identifier (ID) is received from the controller (remote controller) 122, the image data (font data) and the additional data (image data) such as a broadcasting station logo mark acquired from the memory 133 are synthesized.

On the other hand, in a case where data for designating a camera identifier (ID) is received from the controller (remote controller) 122, image data (font data) regarding a camera identifier (ID) corresponding to the designation data is acquired from the memory 133, and the acquired image data (font data) and the additional data (image data) such as a broadcasting station logo mark acquired from the memory 133 are synthesized.

FIG. 13 depicts data generated by the synthesis process, for example. The data is formed by combining a camera identifier (ID) and additional data such as a broadcasting station logo mark representing the name of a broadcasting station.

(Step S34)

Next, in step S34, the control unit 132 executes a display process by outputting the synthesized data generated by the synthesis process in step S33 to the electric paper display unit 131.

(Step S35)

Step S35 is a process for displaying the synthesized data at the electric paper display unit 131.

Under control of the control unit 132, the synthesized data including the camera identifier (ID) and the additional data such as a broadcasting station logo mark representing the name of a broadcasting station is displayed on the electric paper display unit 131.

For example, synthesized data depicted in FIG. 13 is displayed.

It is to be noted that FIG. 13 depicts an example in which synthesized data formed by vertically arranging two different types of information:

(a) identification information: a camera number=3 as a camera identifier (ID); and (b) additional information: the name of a company using the camera apparatus 100, for example, a logo mark=XYZ representing a broadcasting station, is displayed on the electric paper display unit 131 of the camera apparatus 100. Not only a camera identifier (ID) but also various data can be displayed on the electric paper display unit 131.

In addition, in the synthesis process of additional information and identification information, a place where the additional information is displayed and a place where the identification information is displayed are not limited to particular places in the display unit. In the example depicted in FIG. 13, the identification information and the additional information are displayed on the lower side and the upper side of the display unit, respectively. Alternatively, the information displayed on the upper side and the information displayed on the lower side may be reversed, or the identification information and the additional information may be displayed on the left side and the right side of the display unit, respectively.

Moreover, each of the font sizes of the additional information and the identification information constituting the synthesized data which is generated by the control unit 132 can be adjusted to any size. For example, the font sizes may be automatically adjusted according to a display region in the display unit.

For example, the synthesis process may be executed so as to adjust the font size of the identification information and the font size of the additional information to be equal to each other. Alternatively, adjustment may be made so as to make the identification information large and make the additional information small, and vice versa. Also, the control unit may automatically change the font sizes during the synthesis process such that the synthesized information is included in the display unit. Furthermore, the font sizes of the information may be changed in the synthesis process in accordance with an instruction from a user.

It is to be noted that, during execution of the processes in FIG. 14, the camera apparatus 100 needs to be turned on to supply power to the respective components in the camera apparatus 100, but, once step S35 is completed, that is, once the synthesized data including the camera identifier (ID) and the additional data such as a broadcasting station logo mark representing the name of a broadcasting station is displayed on the electric paper display unit 131, the synthesized data is continuously displayed on the electric paper display unit 131 even after the camera apparatus 100 is turned off.

[6. Configuration Example of Displaying Data on Electric Paper Display Unit]

The examples of synthesized data including a camera identifier (ID) and additional data such as a broadcasting station logo mark representing the name of a broadcasting station, and the display sequence therefor have been explained with reference to FIGS. 13 and 14. However, besides the aforementioned examples, various data can be displayed on the electric paper display unit 131.

Examples of data which is displayed on the electric paper display unit 131 will be explained with reference to FIGS. 15A, 15B, 15C, and 15D.

FIGS. 15A, 15B, 15C, and 15D depict, as examples of display data on the electric paper display unit 131, four examples of additional data which is displayed in addition to a camera identifier (ID).

Figure 15:
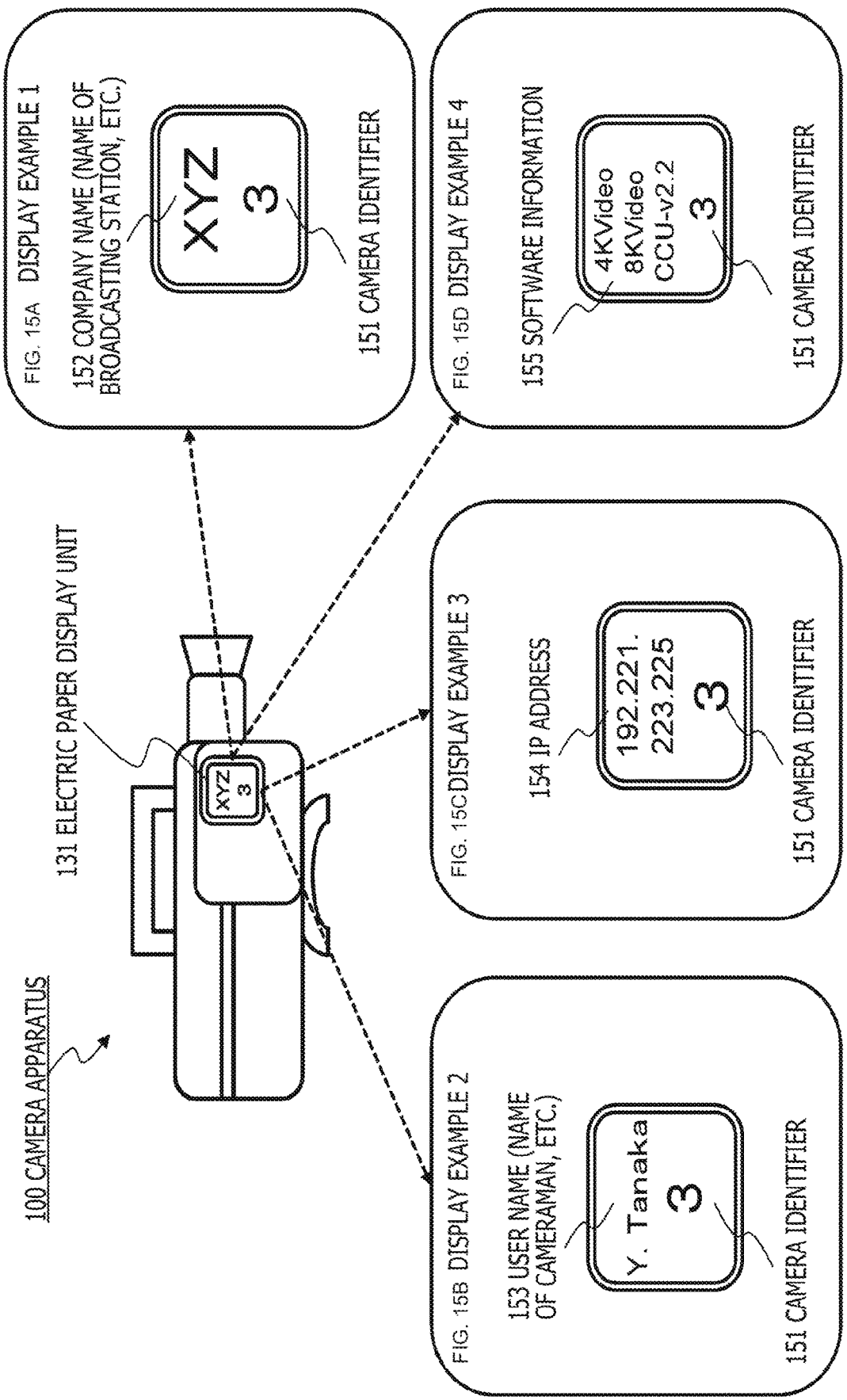
FIGS. 15A, 15B, 15C, and 15D is a are diagrams of an example of data which is displayed on the electric paper display unit.

FIG. 15A Display example 1 is an example of display data similar to that having been explained with reference to FIG. 13, and is an example in which a company name 152 such as a broadcasting station logo mark representing the name of a broadcasting station is displayed in addition to a camera identifier (ID) 151.

The camera apparatuses 100 are expensive, and thus, are often rented to some companies, broadcasting stations and the like. In this case, setting to display the name of an owner company, setting to display the name of the current user company, or the like can be made. The name of any one of these companies is read out from an inner camera memory or from an external memory and is displayed, so that the name can be easily rewritten.

FIG. 15B Display example 2 is an example in which a user name 153 representing the name of a camera user such as a cameraman is displayed in addition to the camera identifier (ID) 151.

A number of cameras of the same type are used in production of content such as a broadcast program.

In this case, when the name of a cameraman who is a user of each camera is displayed, the camera corresponding to the user can be properly selected and used.

It is to be noted that a user of the camera apparatus 100 is constantly changed in some cases. User names are preliminarily registered in a camera memory or in an external memory, and are read out, selected, and displayed during a usage time, so that the name of a particular user can be displayed.

It is to be noted that the installation place of the camera, for example, may be displayed in place of the name of a cameraman or in addition to the name of a cameraman.

FIG. 15C Display example 3 is an example in which an IP address 154 of the camera is displayed in addition to the camera identifier (ID) 151. A number of cameras for use in production of content such as a broadcast program are connected to an external apparatus such as the controller (remote controller) 122, over an IP network, for example.

In construction of a network, communication cables of the camera apparatuses need to be respectively connected to predetermined connection terminals of a relay. For example, in a case where each of the terminals of the relay is set as a fixed IP address-equipped terminal, the communication cable of each of the cameras needs to be connected to one connection terminal, of the relay, having the corresponding IP address.

When an IP address is displayed on each camera apparatus, the camera apparatus can be properly connected.

The camera is usually connected while being in an off state. Display data on the electric paper display unit 131 is continuously displayed during the off state. Accordingly, a connection work can be conducted while an IP address is confirmed.

FIG. 15D Display example 4 is an example in which software information (software option) 155 installed in the camera apparatus 100 is displayed in addition to the camera identifier (ID) 151.

Various types of software are installed in the camera apparatus 100.

Specifically, examples of software for enabling shooting of a full high-definition video and image processing, include software for executing processing for 2K images, software for processing 4K images, and software for processing 8K images.

The examples further include software for enabling communication with an apparatus, such as a CCU, which is to be connected to the camera apparatus, when the CCU has a specific latest function.

Thus, various types of software are installed in the camera apparatuses 100, and what process is executable depends on the installed software.

A cameraman needs to preliminarily understand a function of a camera apparatus which the cameraman is to use. Cameramen have conventionally confirmed software information by checking instruction manuals, etc., attached to cameras, or by actually starting software in the cameras.

When installed software information (software option) is displayed on the electric paper display unit 131, a cameraman can immediately understand a process that is executable in the camera apparatus 100.

It is to be noted that FIGS. 15A, 15B, 15C, and 15D depict, as display examples of synthesized data on the electric paper display unit 131, four examples of synthesized data FIGS. 15A, 15B, 15C, and 15D including the camera identifier (ID) and four types of additional data, and the synthesized data FIGS. 15A, 15B, 15C, and 15D can be switched by a user at any timing, or can be set to be automatically switched under a predetermined condition.

Automatic switching of display data is not particularly limited to this example. Automatic switching may be performed in accordance with an on/off timing of the camera. During a power off time, synthesized data FIG. 15D) including license information can be displayed on the electric paper part, and during a power on time, synthesized data FIG. 15A) including logo information can be displayed.

By this setting, the software information (software option) 155 in FIG. 15D can be confirmed without power supply, so that a user can preliminarily confirm what function of the camera can be used.

In addition, in a case where the camera is turned on and used, the company name 152 such as a broadcasting station logo mark representing the name of a broadcasting station is displayed. Thus, a merit that information regarding which station is using the camera can be immediately confirmed, is provided.

[7. Configuration Example of Electric Paper Module Including Electric Paper Display Unit and Data Processing Unit]

Next, a configuration example of an electric paper module including an electric paper display unit and a data processing unit will be explained.

Figure 16:
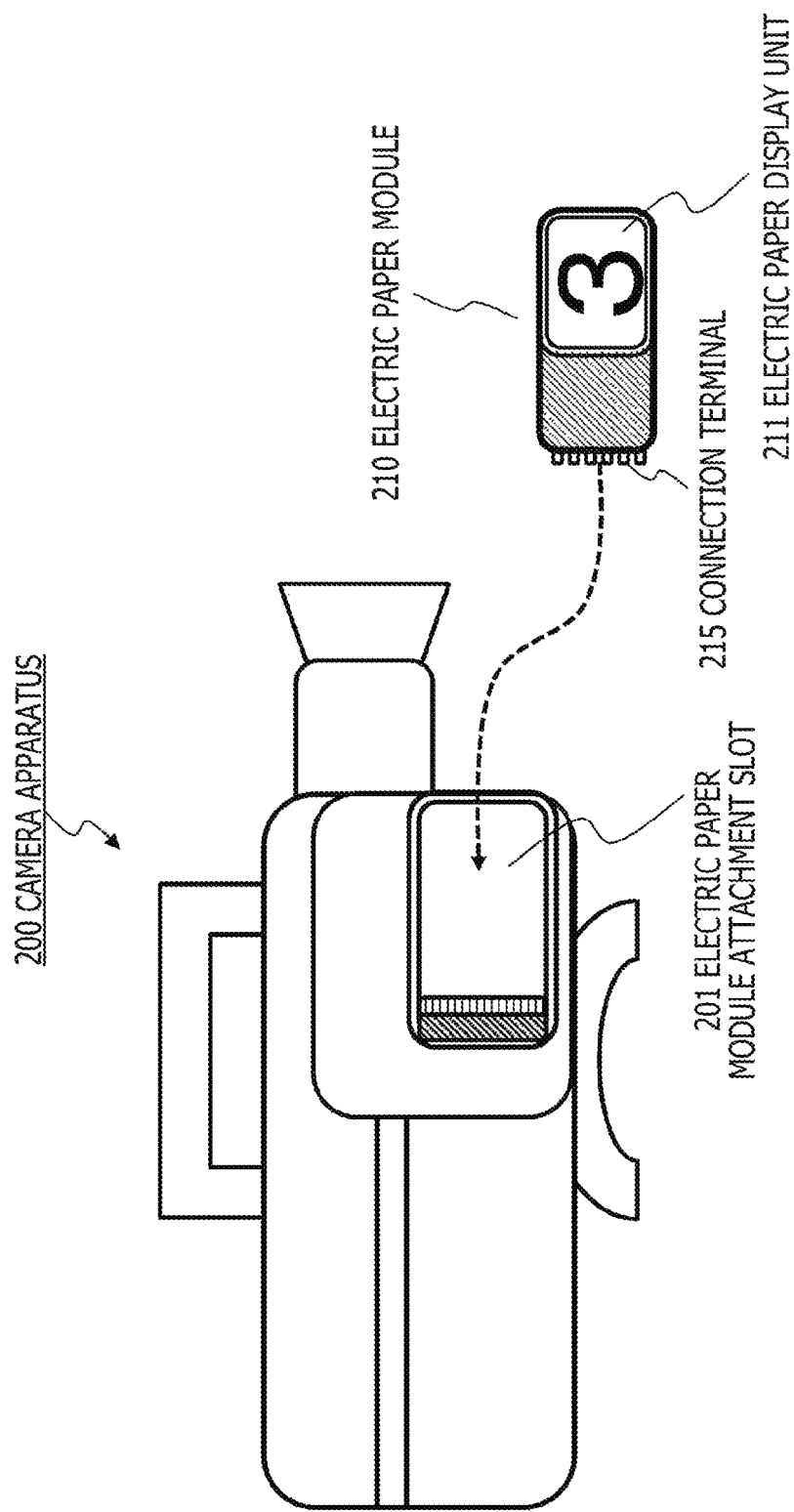
FIG. 16 is a diagram of a configuration example and a usage example of an electric paper module.

FIG. 16 is a diagram of a configuration example and a usage example of an electric paper module 210.

The electric paper module 210 is attachable to and detachable from a camera apparatus 200.

The electric paper module 210 includes an electric paper display unit 211 and a connection terminal 215.

When the electric paper module 210 is attached into an electric paper module attachment slot 201 in the camera apparatus 200, electrical connection with the camera apparatus 200 is established, so that power can be supplied from the camera apparatus 200 and data communication with the camera apparatus 200 can be performed.

Figure 17:
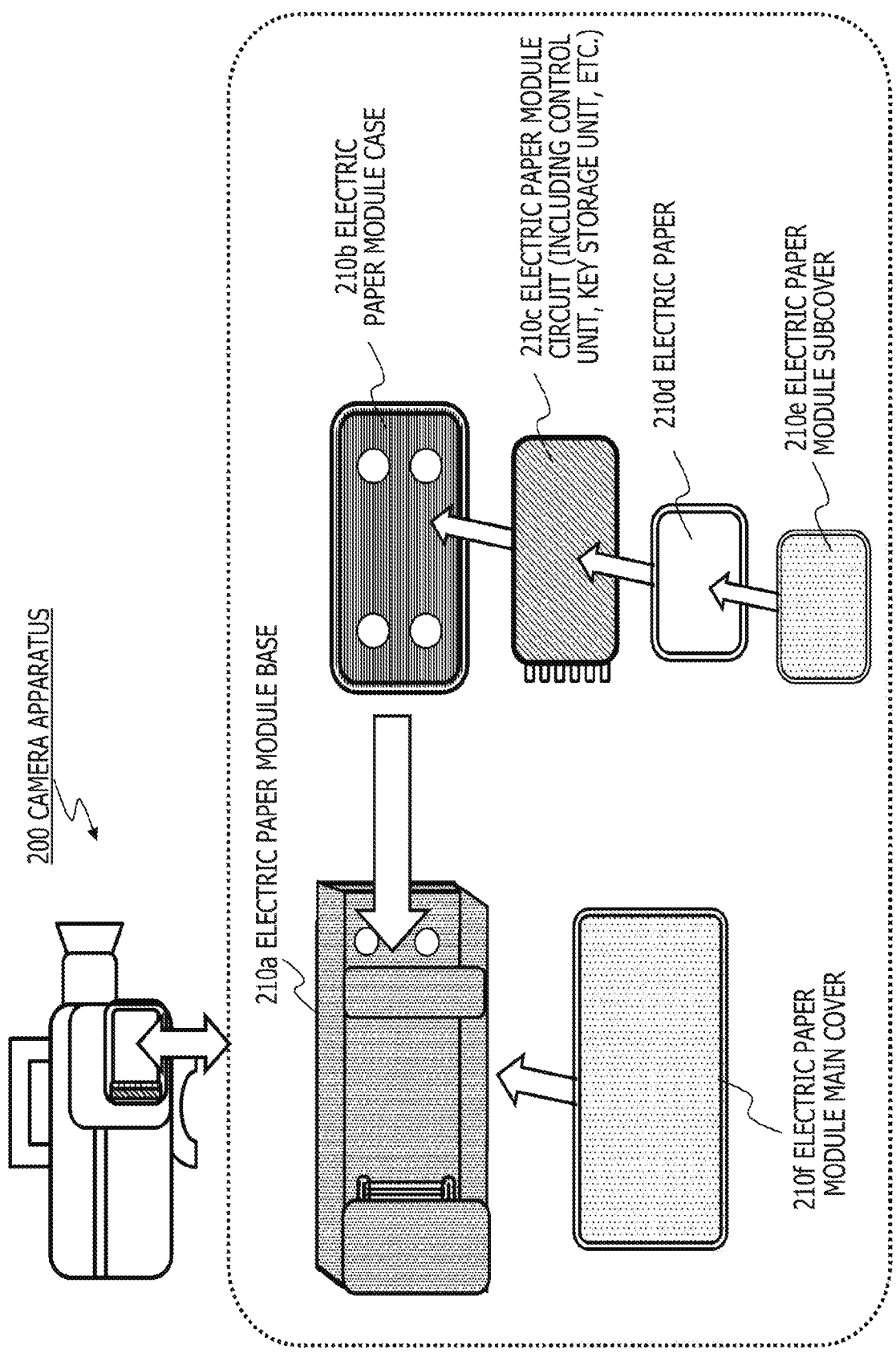
FIG. 17 is a diagram of a configuration example of the electric paper module.

An inner configuration example of the electric paper module 210 will be explained with reference to FIG. 17. As depicted in FIG. 17, the following four components:
an electric paper module case 210b;
an electric paper module circuit 210c;
an electric paper 210d; and
an electric paper module subcover 210d are layered from the lower layer to the upper layer in an electric paper module base 210a.

The electric paper module 210 has a configuration in which the layered structure of the above four components is stored in the electric paper module base 210a, and further, an electric paper module main cover 210f is put on the top portion of the electric paper module base 210a.

Identification information and the like are displayed on the electric paper 210d.

The electric paper module circuit 210c includes a circuit board on which a control unit that performs display control of data displayed on the electric paper 210d, a memory, and the like are formed.

A configuration example of the camera apparatus 200 having the electric paper module 210 attached thereto will be explained with reference to FIG. 18.

The camera apparatus 200 depicted in FIG. 18 corresponds to a configuration obtained by replacing the electric paper display unit 131 in the camera apparatus 100 having been explained with reference to FIG. 7, with the electric paper module 210.

Figure 18:
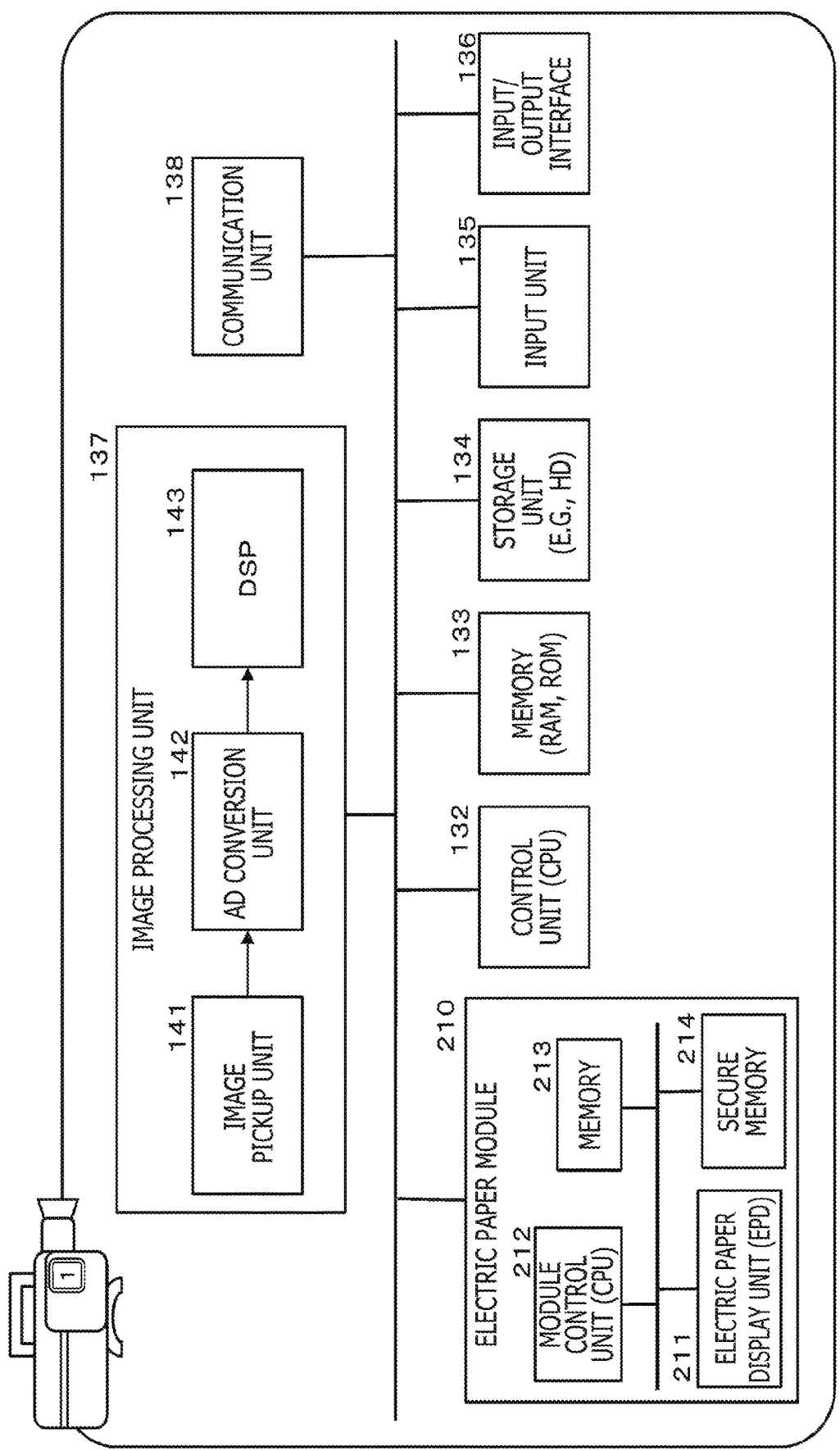
FIG. 18 is a diagram of a configuration example of a camera apparatus having the electric paper module attached thereto.

As illustrated in FIG. 18, the camera apparatus 200 includes the electric paper module 210, the control unit (CPU) 132, the memory (e.g., RAM or ROM) 133, the storage unit (e.g., HD) 134, the input unit 135, the input/output interface 136, the image processing unit 137, and the communication unit 138.

The image processing unit 137 includes the image pickup unit 141, the AD conversion unit 142, and the DSP (Digital Signal Processor) 143.

It is to be noted that, in the configuration example of the camera apparatus 200 depicted in FIG. 18, only main components of the camera apparatus 200 are depicted. Besides the components depicted in FIG. 18, various components such as a sound processing unit, a monitor on which taken images are confirmed, a battery for supplying power, and a power source switch, for example, are included in the camera apparatus 200.

Except for the electric paper module 210, the camera apparatus 200 depicted in FIG. 18 includes components similar to those having been explained with reference to FIG. 7, and thus, an explanation thereof is omitted.

The electric paper module 210 includes the electric paper display unit (EPD) 211, a module control unit (CPU) 212, a memory 213, and a secure memory 214.

The electric paper display unit 211 has a configuration similar to that of the electric paper display unit 131 of the camera apparatus 100 depicted in FIG. 7 having explained above.

Specifically, for example, the electric paper display unit 211 is a display unit which uses electrophoresis electric paper and on which displayed data can be continuously displayed even after power supply is stopped although power is needed to change the displayed content.

The module control unit (CPU) 212 generally controls various processes which are executed at the electric paper module 210. For example, the module control unit (CPU) 212 controls various processes including a process of displaying data on the electric paper display unit 211, a process of performing data communication with the camera apparatus 200, a process of recording data into the secure memory 214 and reading out data from the secure memory 214, and the like.

Programs necessary for these processes are stored in the memory 213. The control unit (CPU) 212 executes the various processes in accordance with the programs stored in the memory 213.

The memory 213 stores a program which is executed by the module control unit (CPU) 212, a parameter for use in a process which is executed by the module control unit (CPU) 212, and the like, and further, is used as a work area for data processing which is executed by the module control unit (CPU) 212. Also, the memory 213 is used as a storage area for display data to be displayed on the electric paper display unit 131.

Access to the secure memory 214 is limited, and secure data having confidentiality is stored in the secure memory 214.

For example, an option key including key data necessary to set a particular process to be executable in the camera apparatus 200, or the like is stored in the secure memory 214.

There are various types of option keys. For example, the option keys include:

(a) key data for shooting a 4K image, processing the image, and enabling an output of a 4K format image, by means of the camera apparatus 200; and (b) key data for shooting a high frame rate image for reproduction of a slow motion video, processing the image, and enabling an output of the high frame rate image, by means of the camera apparatus 200.

The option keys further include various types other than the above types. The camera apparatus 200 reads out an option key from the secure memory 214 of the electric paper module 210, and executes a predetermined process by using the read option key, whereby particular software (program) stored in the memory 133 or the storage unit 134 of the camera apparatus 200 can be started.

For example, in order to shoot a 4K image and perform image processing in the camera apparatus 200, 4K image processing software (program) stored in the memory 133 or the storage unit 134 of the camera apparatus 200 needs to be read out, started, and executed.

For example, an option key for 4K images serves a role as a password that is necessary to permit the software (program) to be read out, started, or executed. Alternatively, an option key for 4K images may be set as a decryption key for an encrypted program.

In a case where the camera apparatus 200 successfully reads out an option key from the secure memory 214 of the electric paper module 210, the camera apparatus 200 can shoot a 4K image, perform data processing thereon, and output the image. In a case where the camera apparatus 200 fails to read out an option key, the camera apparatus 200 cannot perform at least one of shooting a 4K image, performing data processing thereon, or outputting the image.

Thus, an option key includes data that is necessary for the camera apparatus 200 to execute a particular process to which a particular processing program is applied.

Specific types of option keys and processes using the option keys will be described in detail later.

It is to be noted that access to the secure memory 214 is limited, and thus, external apparatuses are not allowed to freely write data into the secure memory 214 or read out data from the secure memory 214. To make an access (write or read data) from an external apparatus, a predetermined authentication needs to be executed between the electric paper module 210 and the external apparatus so as to confirm that the external apparatus is a reliable and valid apparatus. The authentication is executed by the module control unit (CPU) 212.

It is to be noted that examples of the external apparatus include not only the controller 122 and the CCU 110 but also the external memory 150 and the camera apparatus 200 having the electric paper module 210 attached thereto.

In a case where any of these external apparatuses makes an access to the secure memory 214 in the electric paper module 210, a predetermined authentication needs to be executed, and the authentication needs to be established.

Similar to the electric paper display unit 131 integrated with the camera apparatus 100 having been explained with reference to FIGS. 7, 8, 9, 10, 11, 12, 13, 14, 15A, 15B, 15C, and 15D, the electric paper display unit 211 of the electric paper module 210 can display a camera identifier (ID) or other additional data.

One example of a sequence for displaying data on the electric paper display unit 211 of the electric paper module 210 will be explained with reference to a sequence diagram depicted in FIG. 19.

Figure 19:
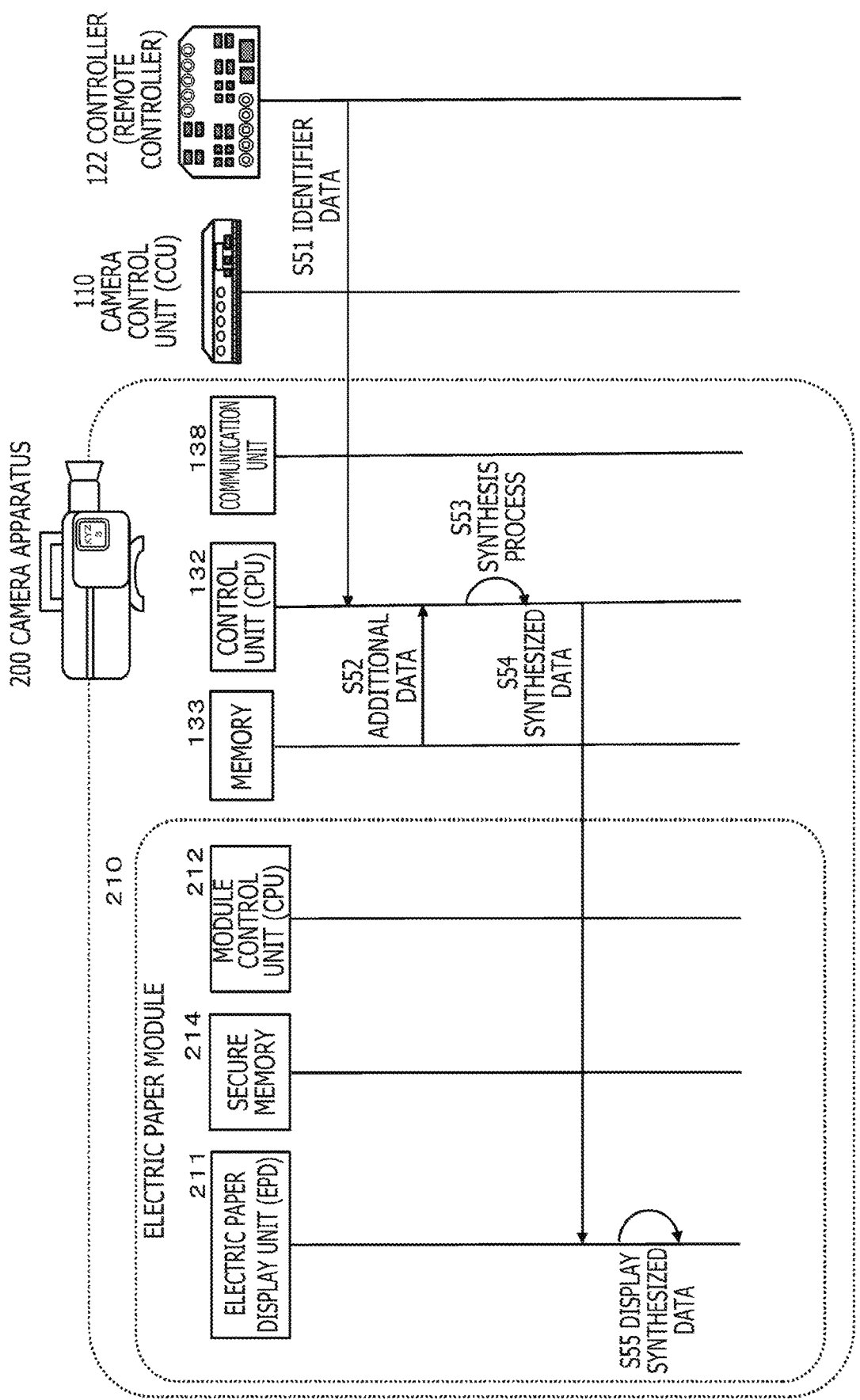
FIG. 19 is a diagram of one example of a sequence of displaying data on an electric paper display unit in the electric paper module.

FIG. 19 is a diagram of a sequence of the "Display Processing Example 2" having been explained with reference to FIGS. 13 and 14, that is, a process of displaying, on an electric paper display unit, synthesized data including a camera identifier (ID) and additional data such as a logo mark=XYZ representing a broadcasting station, for example.

FIG. 19 depicts, from the left side,
the camera apparatus 200,
the camera control unit (CCU) 110, and
the controller (remote controller) 122.

These three apparatuses are configured to be able to communicate with one another by wire or wirelessly.

Further, FIG. 19 depicts, among the internal components of the camera apparatus 200, the following components:
the electric paper module 210;
the memory 133;
the control unit 132; and
the communication unit 138.

In addition, as internal components of the electric paper module 210,
the electric paper display unit 211,
the secure memory 214, and
the module control unit 211 are depicted.

FIG. 19 depicts one example of a sequence for displaying, on the electric paper display unit 211 of the electric paper module 211 attached to the camera apparatus 200, additional data such as a broadcasting station logo mark representing the name of a broadcasting station in addition to a camera identifier (ID).

In this process sequence, the control unit 132 of the camera apparatus 200 executes a synthesis process of the following two types of data:

(Data 1) data regarding a camera identifier (ID) transmitted from the controller (remote controller) 122; and (Data 2) additional data (e.g., broadcasting station logo mark) stored in the memory 133, and executes a process for displaying the data on the electric paper display unit 211 of the electric paper module 211.

The process proceeds in an order from step S51 to step S55 in FIG. 19. Hereinafter, these steps will be explained.

(Step S51)

First, in step S51, an operator on the controller (remote controller) 122 side determines a camera identifier (ID) to be displayed on the electric paper display unit 211 of the electric paper module 211 attached to the camera apparatus 200, and the controller (remote controller) 122 transmits data (camera identifier data) for displaying the determined camera identifier (ID) to the camera apparatus 200.

In a case where the CCU 110 is present between the controller (remote controller) 122 and the camera apparatus 200, the transmission data from the controller (remote controller) 122 is transmitted to the camera apparatus 200 via the CCU 110.

On the other hand, in a case where no CCU 110 is present between the controller (remote controller) 122 and the camera apparatus 200, the transmission data from the controller (remote controller) 122 is transmitted directly to the camera apparatus 200 not via the CCU 110.

It is to be noted that data transmitted from the controller (remote controller) 122 to display the camera identifier (ID), that is, the camera identifier data is either image data (font data) regarding a determined camera identifier (ID), or data for designating the camera identifier (ID), as in the aforementioned example.

The transmission data from the controller (remote controller) 122 is inputted to the control unit 132 via communication unit 138 of the camera apparatus 200.

(Step S52)

Next, in step S52, the control unit 132 acquires additional data from the memory 133.

That is, additional data such as a broadcasting station logo mark to be displayed in addition to the camera identifier (ID), is acquired from the memory 133.

It is to be noted that the additional data does not need to be acquired from the memory 133, and may be acquired from the storage unit 134 or the external memory 150.

(Step S53)

Next, in step S53, the control unit 132 executes a synthesis process of the following two types of data:

(Data 1) data regarding the camera identifier (ID) received from the controller (remote controller) 122; and (Data 2) the additional data (e.g., broadcasting station logo mark) acquired from the memory 133.

By synthesizing these two types of data, the control unit 132 generates data to be displayed on the electric paper display unit 211 in the electric paper module 211 attached to the camera apparatus 200.

It is to be noted that, in a case where image data (font data) regarding the camera identifier (ID) is received from the controller (remote controller) 122, the image data (font data) and the additional data (image data) such as a broadcasting station logo mark acquired from the memory 133 are synthesized.

On the other hand, in a case where data for designating a camera identifier (ID) is received from the controller (remote controller) 122, image data (font data) regarding a camera identifier (ID) corresponding to the designation data is acquired from the memory 133, and the acquired image data (font data) and the additional data (image data) such as a broadcasting station logo mark acquired from the memory 133 are synthesized.

FIG. 13 depicts data generated by the synthesis process, for example. The data is formed by combining a camera identifier (ID) and additional data such as a broadcasting station logo mark representing the name of a broadcasting station.

(Step S54)

Next, in step S54, the control unit 132 executes a display process by outputting the synthesized data generated by the synthesis process in step S53 to the electric paper display unit 211 of the electric paper module 211 attached to the camera apparatus 200.

(Step S55)

Step S55 is a process for displaying the synthesized data at the electric paper display unit 211 of the electric paper module 211 attached to the camera apparatus 200.

Under control of the control unit 132, the synthesized data including the camera identifier (ID) and the additional data such as a broadcasting station logo mark representing a broadcasting station, is displayed on the electric paper display unit 131.

For example, the synthesized data is displayed in a manner similar to that in FIG. 13.

It is to be noted that, during execution of the processes in FIG. 19, the camera apparatus 200 needs to be turned on to supply power to the respective components in the camera apparatus 200 and the respective components in the electric paper module 211 attached to the camera apparatus 200, but, once step S55 is completed, that is, once synthesized data including the camera identifier (ID) and the additional data such as a broadcasting station logo mark representing a broadcasting station is displayed on the electric paper display unit 211 of the electric paper module 211 attached to the camera apparatus 200, the synthesized data is continuously displayed on the electric paper display unit 211 even after the camera apparatus 200 is turned off.

Next, specific examples of an option key including stored data in the secure memory 214 of the electric paper module 210, and specific processes using the option key will be explained.

As explained above, access to the secure memory 214 is limited, secure data which is desired to have confidentiality is stored in the secure memory 214, and an option key is stored in the secure memory 214.

The option key includes key data that is necessary to set a particular process to be executable in the camera apparatus 200.

There are various types of option keys.

Specific examples of the option keys will be explained with reference to FIG. 20.

FIG. 20 depicts examples of the following three types of option keys:

(1) camera output permission format setting key;

(2) camera connection permission configuration setting key; and (3) camera execution permission function setting key.

The (1) camera output permission format setting key refers to an option key which is set to permit an output of particular format data to a camera that has successfully read out the option key stored in the secure memory 214 of the electric paper module 210.

For example, an output permission format corresponding to the option key is defined as follows.

Option key 101: Output permission format=High frame rate image

Option key 102: Output permission format=HDR (High Dynamic Range) image

Option key 103: Output permission format=PsF (Progressive Segmented Frame) image Option key 104: Output permission format=4K image Option key 105: Output permission format=8K image For example, a camera that has successfully read out the option key 101 stored in the secure memory 214 of the electric paper module 210 is permitted to output a high frame rate image from the camera.

A camera that has failed to read out the option key 101 is not permitted to output any high frame rate image from the camera, and thus, prohibition of an output of any high frame rate is set therefor.

Also, a camera that has successfully read out the option key 105 is permitted to output an 8K image from the camera.

A camera that has failed to read out the option key 105 is not permitted to output any 8K image from the camera, and thus, prohibition of an output of any 8K image is set therefor.

The (2) camera connection permission configuration setting key refers to an option key which is set to permit a camera that has successfully read out the option key stored in the secure memory 214 of the electric paper module 210, to establish connection and perform data communication with an external apparatus or a particular inner module of the camera.

For example, a connection permission configuration corresponding to the option key is defined as follows.

Option key 201: Connection permission configuration=Connection with a next-generation CCU/remote controller Option key 202: Connection permission configuration=Exchange of blocks obtained by different image pickup sensors Option key 203: Connection permission configuration=Connection with T-CAM (Ternary Content Addresable Memory) extension block of an image pickup sensor unit)

Option key 204: Connection permission configuration=Exchange to Triax transmission block Option key 205: Connection permission configuration=Exchange to a wireless transmission block Option key 206: Connection permission configuration=Exchange of a Filter Disc Unit For example, a camera that has successfully read out the option key 201 stored in the secure memory 214 of the electric paper module 210 is permitted to establish connection and perform communication with a next-generation CCU/remote controller.

For a camera that has failed to read out the option key 201, prohibition of connection and communication with a next-generation CCU/remote controller is set.

The (3) camera execution permission function setting key refers to an option key which is set to permit a camera that has successfully read out the option key stored in the secure memory 214 of the electric paper module 210, to execute a particular function.

For example, an execution permission function corresponding to the option key is defined as follows.

Option key 301: Execution permission function=Function of transmitting data between CAM-CCU at a specific wavelength or longer Option key 302: Execution permission function= Multi-camera system function Option key 303: Execution permission function= Aberration correction function (ALAC)

Option key 304: Execution permission function=Data recording function

For example, a camera that has successfully read out the option key 301 stored in the secure memory 214 of the electric paper module 210 is permitted to execute a function of transmitting data between the camera and a CCU at a specific wavelength or longer.

A camera that has failed to read out the option key 301 is set to be unable to execute a function of transmitting data between the camera and a CCU at the specific wavelength or longer.

As explained above, an option key has a role to set a process executable in a camera that has successfully read out the option key.

As depicted in FIG. 20, an option key is set according to a process to be permitted.

Recording (writing) an option key into the secure memory 214 of the electric paper module 210 can be executed by an external apparatus.

However, recording is done in accordance with a predetermined sequence in order to prevent fraudulent writing.

One example of a sequence of recording (writing) an option key into the secure memory 214 of the electric paper module 210 will be explained with reference to a sequence diagram in FIG. 21.

In FIG. 21, from the left side,
the camera apparatus 200,
the camera control unit (CCU) 110, and
the controller (remote controller) 122 are depicted.

These three apparatuses are configured to be able to communicate with one another by wire or wirelessly.

Furthermore, FIG. 21 depicts, among the internal components of the camera apparatus 200, the following components:
the electric paper module 210;
the memory 133;
the control unit 132; and
the communication unit 138.

In addition, as internal components of the electric paper module 210,
the electric paper display unit 211,
the secure memory 214, and
the module control unit 211 are depicted.

FIG. 21 depicts one example of a sequence in which the controller (remote controller) 122 connected to the camera apparatus 200 having the electric paper module 200 attached thereto records an option key into the secure memory 214 of the electric paper module 200.

The process proceeds in an order from step S71 to step S74 in FIG. 21. Hereinafter, these steps will be explained.

(Step S71)

First, in step S71, the controller (remote controller) 122 trying to record an option key into the secure memory 214 of the electric paper module 200 outputs a secure memory access request to the control unit 212 of the electric paper module 210 attached to the camera apparatus 200.

(Step S72)

In step S72, the control unit 212 of the electric paper module 210 having received an input of the secure memory access request from the controller (remote controller) 122 executes an authentication to confirm whether or not the controller (remote controller) 122 is an apparatus having a valid secure memory access right, that is, a pre-authorized valid apparatus.

The authentication is executed in accordance with a predefined authenticating algorithm, for example.

For example, an existing authentication based on a public-key encryption method or a common-key encryption method can be used.

Since data (authentication data such as a key) necessary for the authentication is preliminarily stored in an apparatus having a valid secure memory access right, the authentication is executed to confirm whether or not the authentication data is held.

Alternatively, in place of the authentication of an apparatus, a process based on user authentication using verification of a password inputted by a user such as an operator on the controller (remote controller) 122 side may be executed.

In a case where the controller (remote controller) 122 is authenticated through the authentication in step S72 and the controller (remote controller) 122 is confirmed to be an apparatus having a valid secure memory access right, the following step S73 is executed.

However, in a case where the controller (remote controller) 122 is not authenticated through the authentication in step S72 and the controller (remote controller) 122 is not confirmed to be an apparatus having a valid secure memory access right, the following step S73 is not executed. The following steps are abandoned.

In this case, the controller (remote controller) 122 does not write an option key into the secure memory 214 of the electric paper module 200.

(Step S73)

In the case where the controller (remote controller) 122 is authenticated through the authentication in step S72 and the controller (remote controller) 122 is confirmed to be an apparatus having a valid secure memory access right, step S73 is executed.

In step S73, the controller (remote controller) 122 makes an access to the secure memory 214 of the electric paper module 200, and writes an option key into the secure memory 214.

(Step S74)

Step S74 is a process for recording the option key into the secure memory 214 of the electric paper module 211 attached to the camera apparatus 200.

The option key transmitted from the controller (remote controller) 122 is recorded in the secure memory 214 of the electric paper module 211.

It is to be noted that, in the sequence diagram in FIG. 21, the controller (remote controller) 122 has an option key, and the option key outputted by the controller (remote controller) 122 is recorded in the secure memory 214 of the electric paper module 211.

Recording the option key may be conducted not by use of the controller (remote controller) 122 but by use of another apparatus.

Figure 22:
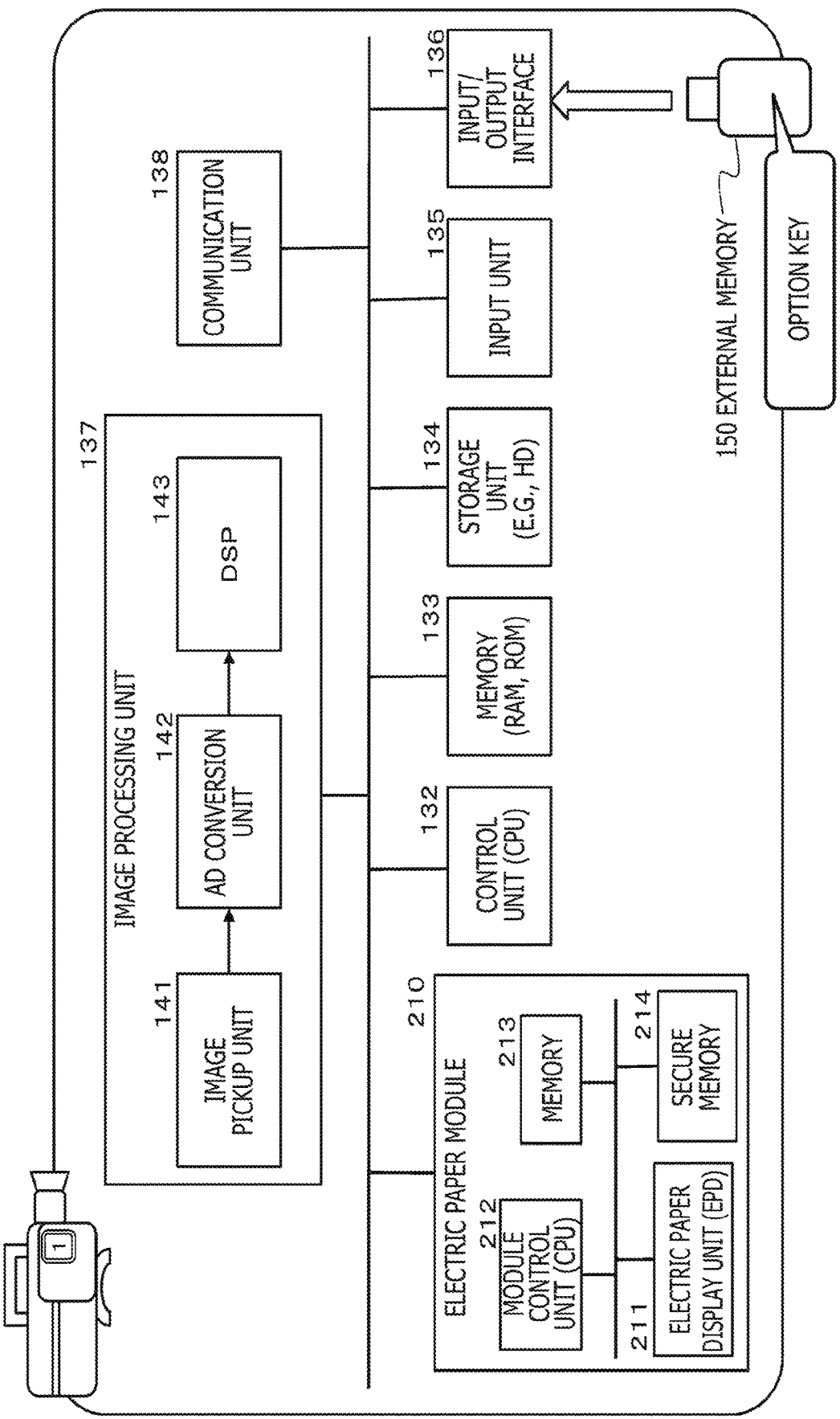
FIG. 22 is a diagram of a process of recording an option key stored in the external memory, into the secure memory of the electric paper module.

For example, as depicted in FIG. 22, an option key may be stored in the external memory 150 such as a USB memory, and the option key stored in the external memory 150 may be recorded into the secure memory 214 of the electric paper module 211.

Also in this case, the control unit 212 of the electric paper module 210 executes an authentication to confirm whether or not the external memory 150 is an apparatus having a valid secure memory access right, that is, a pre-authorized valid apparatus.

The authentication is executed between the control unit 212 of the electric paper module 210 and a control unit of the external memory 150, and the option key stored in the external memory 150 is recorded into the secure memory 214 of the electric paper module 211 on condition that the authentication is established.

Figure 23:
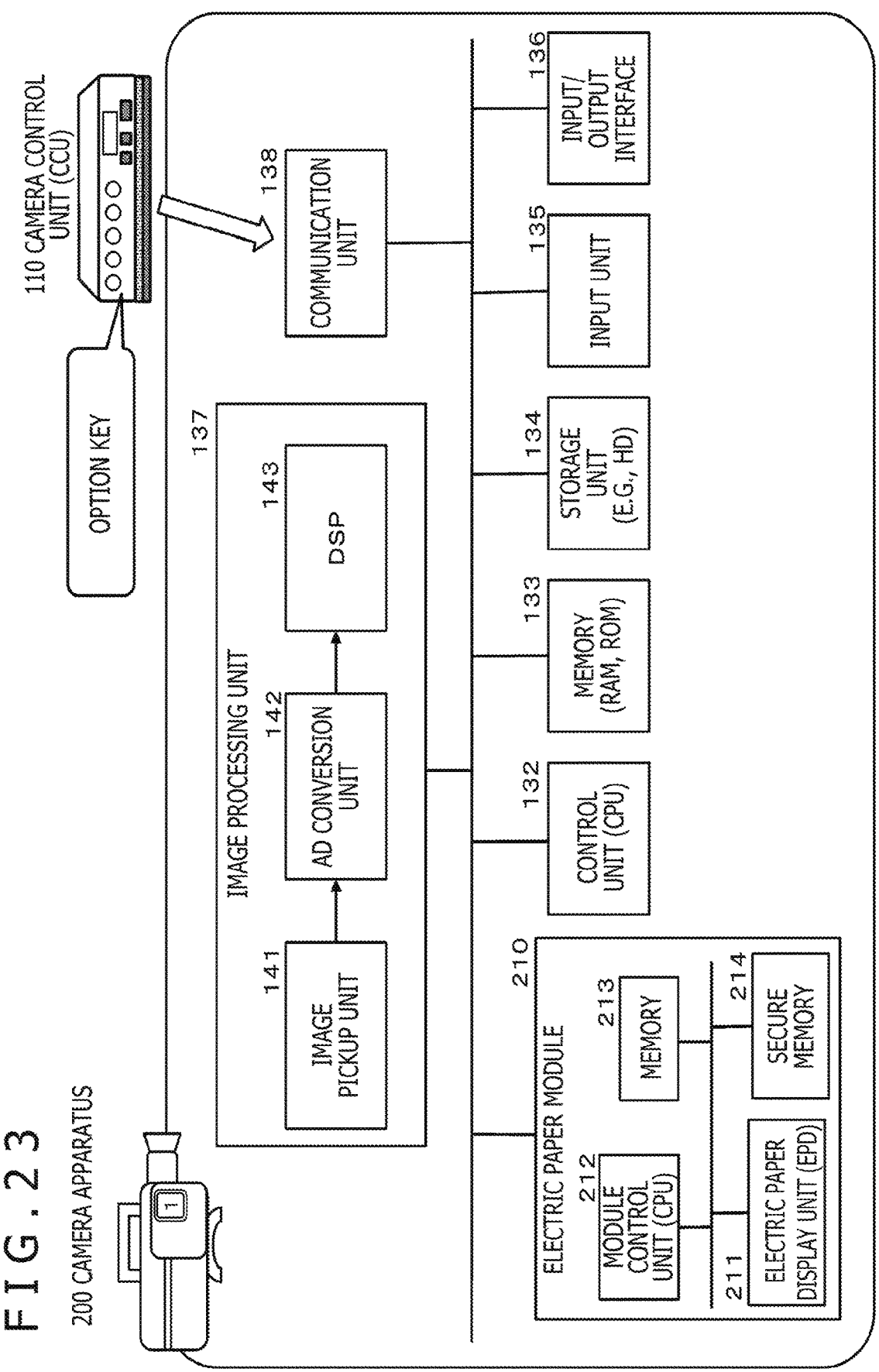
FIG. 23 is a diagram of a process of recording an option key stored in a camera control unit (CCU), into the secure memory of the electric paper module.

In addition, as depicted in FIG. 23, an option key may be stored in the camera control unit (CCU) 110, and the option key stored in the camera control unit (CCU) 110 may be recorded into the secure memory 214 of the electric paper module 211.

Also in this case, the control unit 212 of the electric paper module 210 executes an authentication to confirm whether or not the camera control unit (CCU) 110 is an apparatus having a valid secure memory access right, that is, a pre-authorized valid apparatus.

The authentication is executed between the control unit 212 of the electric paper module 210 and a control unit of the outside camera control unit (CCU) 110, and the option key stored in the camera control unit (CCU) 110 is recorded into the secure memory 214 of the electric paper module 211 on condition that the authentication is established.

Next, a process sequence using an option key stored in the secure memory 214 of the electric paper module 211 will be explained with reference to FIG. 24.

As explained above, an option key includes key data that is necessary to set a particular process to be executable in the camera apparatus 200.

For example, the option key having an option key identifier=105 having been explained above with reference to FIG. 20 is necessary to set permission of an output of an 8K image from a camera.

A camera that has successfully read out the option key 105 is permitted to output an 8K image from the camera.

A camera that has failed to read out the option key 105 is not permitted to output any 8K image, and prohibition of an output of any 8K image is set therefor.

Figure 24:
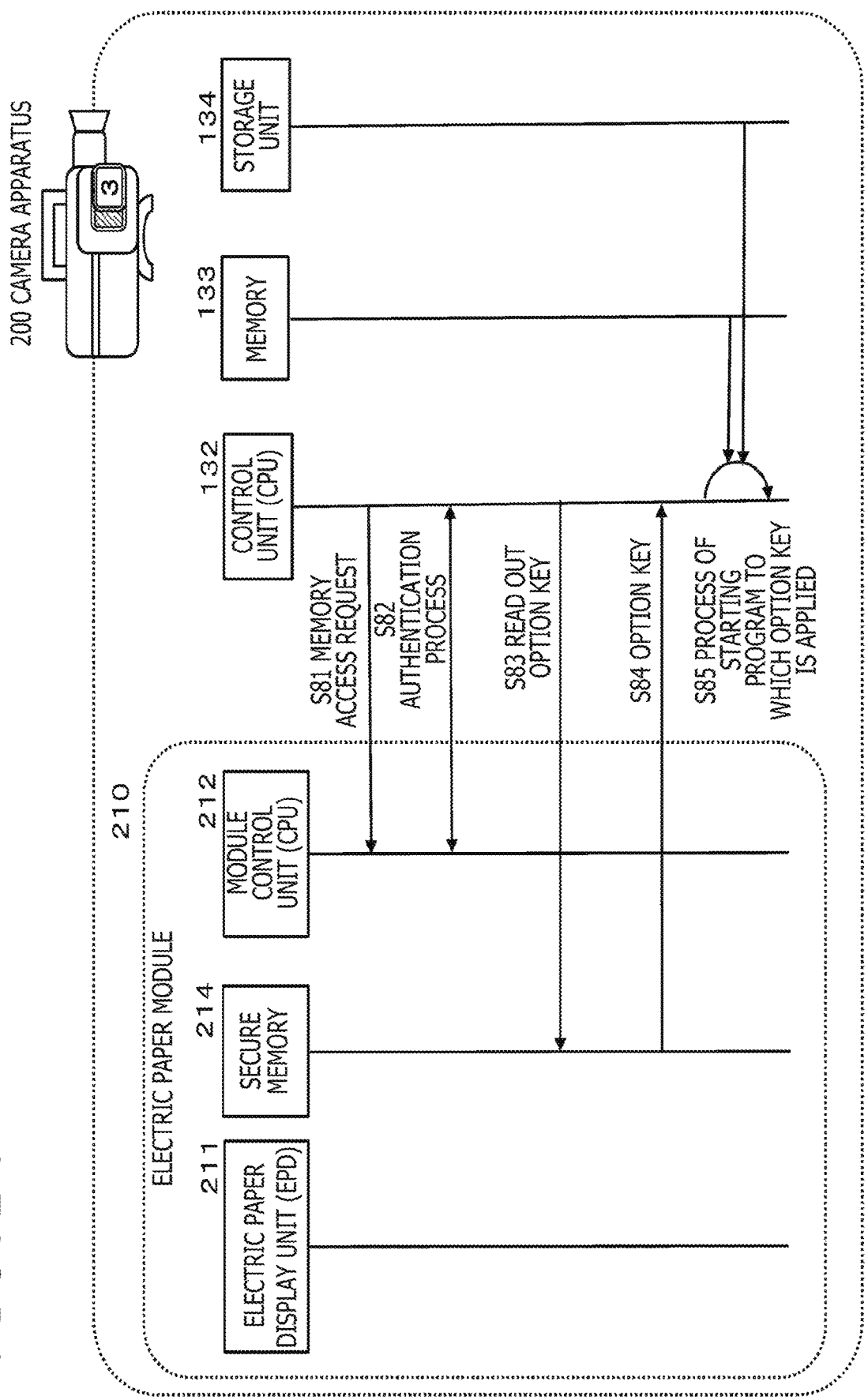
FIG. 24 is a diagram of a sequence of using an option key stored in the secure memory of the electric paper module and displaying key correspondence information.

FIG. 24 is a process sequence for executing a process, such as an output of an 8K image, that is permitted on condition that an option key has been read out.

Among the internal components in the camera apparatus 200, the following components:
the electric paper module 210;
the control unit 132;
the memory 133; and
the storage unit 134 are depicted from the left side in the sequence diagram in FIG. 24.

In addition, as internal components of the electric paper module 210,
the electric paper display unit 211,
the secure memory 214, and
the module control unit 211 are depicted.

FIG. 24 depicts one example of a sequence in which the camera apparatus 200 having the electric paper module 200 attached thereto, reads out an option key from the secure memory 214 of the electric paper module 200, executes a process using the option key, and starts particular data processing.

It is to be noted that, in the example in FIG. 23, the option key includes data that is necessary to start a process program to be executed by the camera apparatus 200.

The process proceeds in an order from step S81 to step S85 in FIG. 23. Hereinafter, these steps will be explained.

(Step S81)

First, in step S81, the control unit 132 of the camera apparatus 200 trying to read out an option key from the secure memory 214 of the electric paper module 200, outputs a secure memory access request to the control unit 212 of the electric paper module 210 attached to the camera apparatus 200.

(Step S82)

In step S82, the control unit 212 of the electric paper module 210 having received an input of the secure memory access request from the control unit 132 of the camera apparatus 200, executes an authentication to confirm whether or not the camera apparatus 200 has a valid secure memory access right, that is, whether or not the camera apparatus 200 is a pre-authorized valid apparatus.

The authentication is executed in accordance with a predefined authenticating algorithm, for example.

For example, the authentication is executed in accordance with a public-key encryption method or a common-key encryption method. Since data (authentication data such as a key) that is necessary for the authentication is preliminarily stored in an apparatus having a valid secure memory access right, the authentication is executed to confirm whether or not the authentication data is held.

It is to be noted that, in place of the authentication of an apparatus, a process based on user authentication using verification of a password inputted by a user such as an operator on the controller (remote controller) 122 side may be executed.

In a case where the camera apparatus 200 is authenticated through the authentication in step S82 and the camera apparatus 200 is confirmed to be an apparatus having a valid secure memory access right, the following step S83 is executed.

However, in a case where the camera apparatus 200 is not authenticated through the authentication in step S82 and the camera apparatus 200 is not confirmed to be an apparatus having a valid secure memory access right, the following step S83 is not executed and the following processes are abandoned.

In this case, the camera apparatus 200 does not read out an option key from the secure memory 214 of the electric paper module 200. As a result, prohibition of a process requiring the option key such as an output of an 8K image, for example, is set.

(Step S83)

In the case where the camera apparatus 200 is authenticated through the authentication in step S82 and the camera apparatus 200 is confirmed to be an apparatus having a valid secure memory access right, step S83 is executed.

In step S83, the control unit 132 of the camera apparatus 200 makes an access to the secure memory 214 of the electric paper module 200, and reads out an option key stored in the secure memory 214.

(Step S84)

In step S84, the control unit 132 of the camera apparatus 200 acquires an option key from the secure memory 214 in the electric paper module 211 attached to the camera apparatus 200.

(Step S85)

Next, in step S85, the control unit 132 of the camera apparatus 200 starts a program to be applied to a process to be executed in the camera apparatus 200, by using the option key from the secure memory 214 in the electric paper module 211.

For example, the program is a program for generating an 8K image format that is necessary to output an 8K image from the camera apparatus 200.

The option key acquired from the secure memory 214 of the electric paper module 211 is used as a password or cipher key necessary to start the program, for example.

As explained with reference to FIG. 24, only a camera apparatus that has successfully acquired an option key is allowed to execute a particular process corresponding to the option key.

It is to be noted that, in the sequence in FIG. 24, option key correspondence information such as software (program) information corresponding a process that is allowed to be executed on the basis of the option key read by the camera apparatus 200 from the secure memory 214 of the electric paper module 211, may be displayed on the electric paper display unit 211 of the electric paper module 211.

Figure 25:
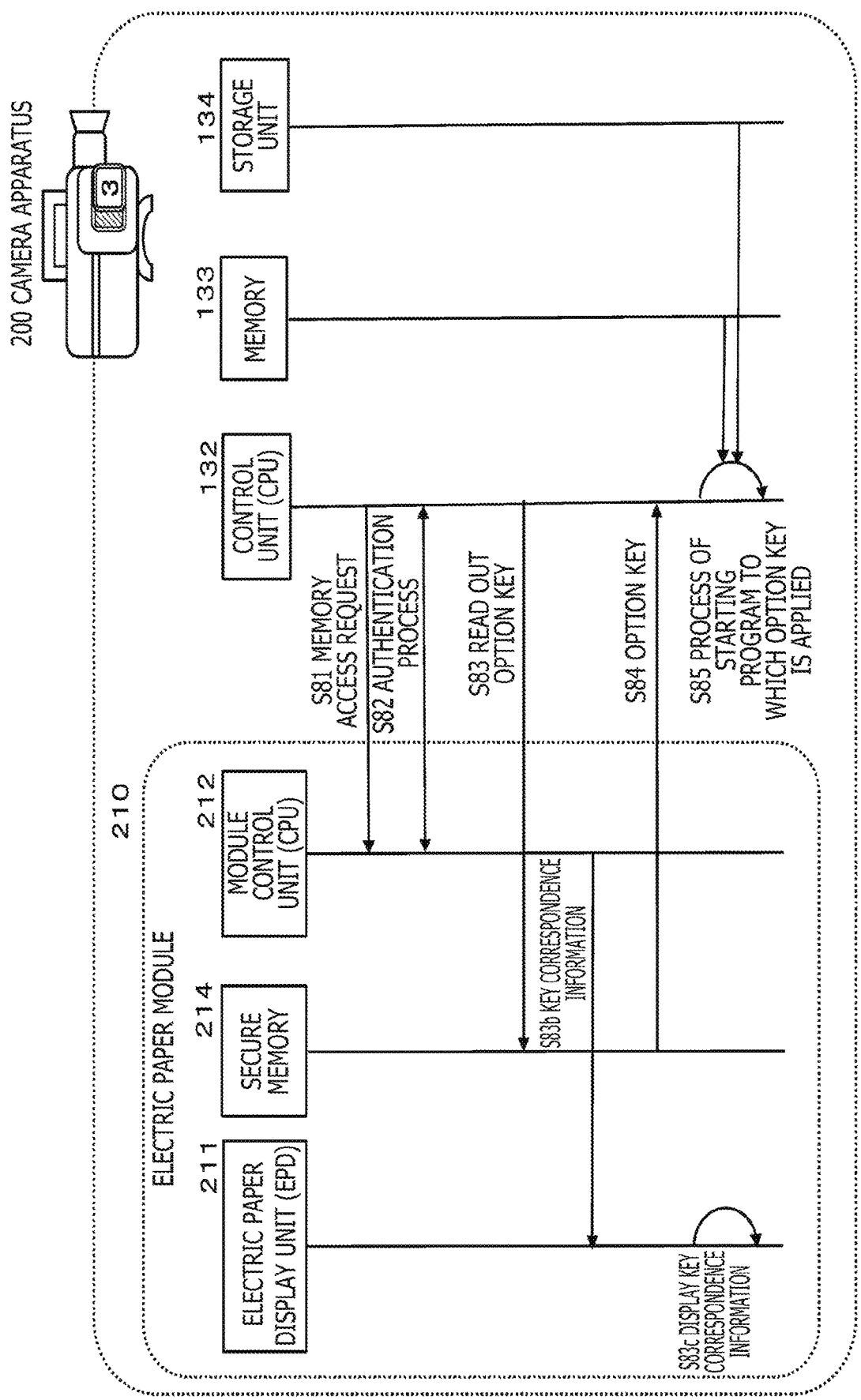
FIG. 25 is a diagram of a sequence of using an option key stored in the secure memory of an electric paper module.

A specific sequence diagram is depicted in FIG. 25.

The sequence diagram in FIG. 25 is obtained by adding step S83*b* and step S83*c* to the sequence diagram having been explained with reference to FIG. 24.

These steps will be explained.

(Step S83*b*)

When the camera apparatus 200 reads out the option key from the secure memory 214 of the electric paper module 200 in step S83, the module control unit 212 of the electric paper module 211 displays, on the electric paper display unit 211 of the electric paper module 211, key correspondence information including software information or a process that is permitted to be executed on the basis of the read option key.

Specifically, for example, in a case where an option key corresponding to software for allowing shooting and outputting of an 8K image is read out, [8K] is displayed as display information on the electric paper display unit 211.

(Step S83*c*)

Step S83*c* is a process for displaying information at the electric paper display unit 211 of the electric paper module 211. Information (option key correspondence information) according to the display process executed by the module control unit 212 of the electric paper module 211 in step S83*b*, is displayed.

Specifically, information, such as [8K], indicating a process that is allowed to be executed by the option key read out by the camera apparatus 200 is displayed.

It is to be noted that the option key correspondence information may be combined with a camera identifier (ID) explained above, and be displayed as synthesized information.

[8. Example of Application to Endoscopic Surgery System]

A technology according to the present disclosure (present technology) is applicable to various products. For example, the technology according to the present disclosure may be applied to an endoscopic surgery system.

Figure 26:
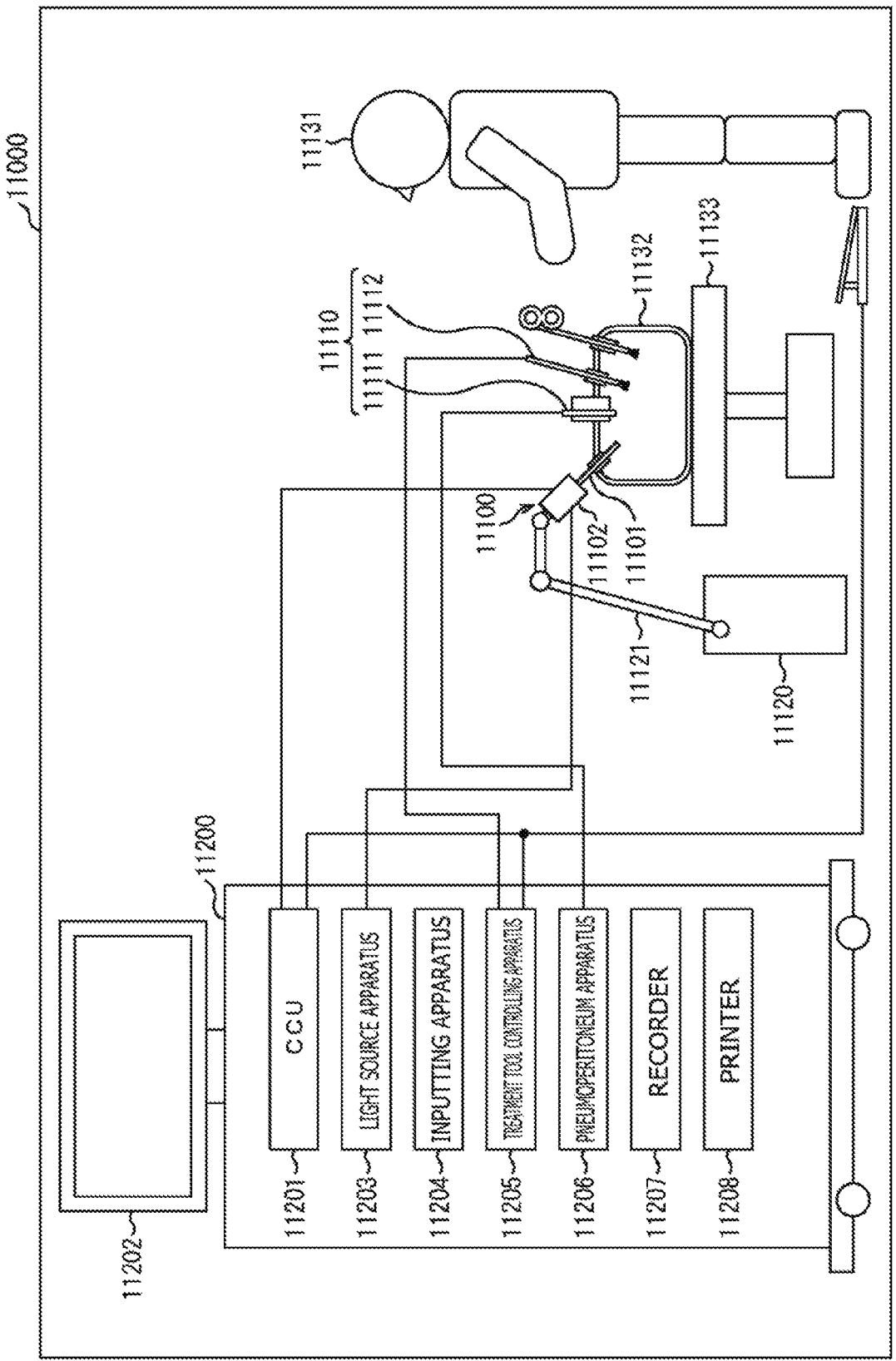
FIG. 26 is a view depicting an example of a schematic configuration of an endoscopic surgery system.

FIG. 26 is a view depicting an example of a schematic configuration of an endoscopic surgery system to which the technology according to an embodiment of the present disclosure (present technology) can be applied.

In FIG. 26, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 27 is a block diagram depicting an example of a functional configuration of the camera head 11102 and the CCU 11201 depicted in FIG. 26.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

One example of the endoscope surgery system to which the technology according to the present disclosure is applicable has been explained above. The electric paper display unit or the electric paper module including the secure memory according to the present disclosure can be formed in the endoscope 11100 or in the supporting arm apparatus 11120 integrated with the endoscope, for example.

When the endoscope 11100 or the supporting arm apparatus 11120 includes an electric paper display unit or an electric paper module including a secure memory according to the present disclosure, an identifier (ID) of the endoscope or additional information such as a user can be confirmed any time, and further, can be easily rewritten.

In addition, when the secure memory having an option key stored therein is included, a process executable by the endoscope 11100 can be defined.

It is to be noted that the endoscope surgery system has been explained as one example, but the technology according to the present disclosure is also applicable to a microscope surgery system and the like, for example.

[9. Conclusion of Configuration according to Present Disclosure]

The embodiments of the present disclosure have been explained above in detail with reference to the particular embodiments. However, it is obvious that a person skilled in the art can make modification or substitution on the embodiments within the gist of the present disclosure. That is, the present invention has been disclosed in a form of exemplifications, and thus, should not be limitedly interpreted. In order to assess the gist of the present disclosure, the claims should be considered.

It is to be noted that the technology disclosed herein may have the following configurations.

(1) A display apparatus including:

an electric paper display unit on which identification information regarding a camera apparatus is displayed; and a control unit that controls display of the identification information in accordance with a predetermined operation, in which the identification information displayed on the display unit is kept displayed, irrespective of power supply to the display unit.

(2) The display apparatus according to (1), in which the control unit displays the identification information on the electric paper display unit in response to, as the predetermined operation, an input of the identification information or designation information corresponding to the identification information via a communication unit from an external apparatus that communicates with the camera apparatus.

(3) The display apparatus according to (1) or (2), in which the control unit displays the identification information on the electric paper display unit in response to, as the predetermined operation, an input of the identification information or designation information corresponding to the identification information from an external memory attached to the camera apparatus.

(4) The display apparatus according to any one of (1) to (3), in which the control unit displays the identification information on the electric paper display unit in response to, as the predetermined operation, an input of the identification information or designation information corresponding to the identification information from an inner memory of the camera apparatus.

(5) The display apparatus according to any one of (1) to (4), in which the control unit displays, on the electric paper display unit, synthesized information including the identification information and additional information.

(6) The display apparatus according to (5), in which the control unit generates the synthesized information by acquiring the additional information from an inner memory of the camera apparatus, and synthesizing the additional information and the identification information.

(7) The display apparatus according to (5) or (6), in which the additional information includes at least any one of a name of a company or a user using the camera apparatus, an IP address unique to the camera apparatus, a process that is executable in the camera apparatus, or software information in the camera apparatus.

(8) The display apparatus according to any one of (5) to (7), in which the control unit controls switching of a display form of the synthesized information in accordance with a user's operation or a predetermined condition.

(9) The display apparatus according to any one of (1) to (8), in which the electric paper module includes the electric paper display unit and a secure memory, and the secure memory is configured to store therein an option key including key data for allowing execution of a particular process in the camera apparatus.

(10) The display apparatus according to (9), in which the option key includes data that is necessary to define at least any one of a permitted output data format of the camera apparatus, a permitted connection configuration of the camera apparatus, or a permitted execution function of the camera apparatus.

(11) The display apparatus according to (9) or (10), in which the electric paper module further includes a module control unit, and the module control unit executes authentication with respect to an apparatus having requested for an access to the secure memory, and permits the access requesting apparatus to make an access to the secure memory on condition that the authentication is established.

(12) A camera apparatus including:

an image pickup unit;

an electric paper display unit that displays identification information regarding the camera apparatus; and a control unit that displays the identification information in accordance with a predetermined operation, in which the identification information displayed on the display unit is kept displayed, irrespective of power supply to the display unit.

(13) The camera apparatus according to (12), in which the control unit displays the identification information on the electric paper display unit in response to, as the predetermined operation, an input of the identification information or designation information corresponding to the identification information from an external apparatus, an external memory, or an inner memory of the camera apparatus.

(14) The camera apparatus according to (12) or (13), in which the control unit displays, on the electric paper display unit, synthesized information including the identification information and additional information.

(15) The camera apparatus according to any one of (12) to (14), in which the electric paper display unit is included in an electric paper module that is attachable to and detachable from the camera apparatus.

(16) The camera apparatus according to (15), in which the electric paper module includes the electric paper display unit and a secure memory, and the secure memory is configured to store therein an option key that is necessary to define at least any one of a permitted output data format of the camera apparatus, a permitted connection configuration of the camera apparatus, or a permitted execution function of the camera apparatus.

(17) The camera apparatus according to (16), in which the control unit executes authentication with respect to the electric paper module, and makes an access to the secure memory on condition that the authentication is established.

(18) An identification information display method which is performed by a display apparatus, the method including:

generating, by means of a control unit, display information in response to an input of identification information regarding a camera apparatus or designation information corresponding to the identification information; and displaying the generated display information on an electric paper display unit on which display is kept irrespective of power supply.

(19) An information processing method which is performed by a camera apparatus, the camera apparatus being configured to have an electric paper module attached thereto, the electric paper module including an electric paper display unit on which display is kept irrespective of power supply, the method including:

a step in which a control unit of the camera apparatus executes authentication with respect to the electric paper module;

a step in which the control unit acquires an option key from a secure memory of the electric paper module on condition that the authentication is established; and a step in which the control unit executes a process that is permitted on condition that the option key has been acquired.

(20) A program for executing information processing in a camera apparatus, the camera apparatus being configured to have an electric paper module attached thereto, the electric paper module including an electric paper display unit on which display is kept irrespective of power supply, the program including:

a step of causing a control unit of the camera apparatus to execute authentication with respect to the electric paper module;

a step of causing the control unit to acquire an option key from a secure memory of the electric paper module on condition that the authentication is established; and a step of causing the control unit to execute a process that is permitted on condition that the option key has been acquired.

Further, the series of processes described herein can be executed by hardware, software, or a composite structure thereof. In a case where the processes are executed by software, a program having a process sequence therefor recorded therein can be executed after being installed in a memory incorporated in dedicated hardware in a computer, or can be executed after being installed in a general-purpose computer capable of various processes. For example, such a program may be previously recorded in a recording medium. The program can be installed in the computer from the recording medium. Alternatively, the program can be received over a network such as a LAN (Local Area Network) or the internet, and be installed in a recording medium such as an internal hard disk.

Note that the processes described herein are not necessarily executed in the described time-series order, and the processes may be executed parallelly or separately, as needed or in accordance with the processing capacity of an apparatus to execute the processes. Further, in the present description, a system refers to a logical set structure including a plurality of apparatuses, and the apparatuses of the structure are not necessarily included in the same casing.

INDUSTRIAL APPLICABILITY

As explained so far, in one embodiment according to the present disclosure, a configuration in which camera identification information is displayed on an electric paper display unit such that the identification information can be confirmed during a power-off time, is implemented.

Specifically, for example, an electric paper display unit that displays camera identification information, and a control unit that, upon receiving an input of identification information to be displayed or information for designating the identification information, executes a display process, are included. The control unit receives an input of the identification information or information for designating the identification information from an external apparatus, an external memory, or an inner memory of a camera, and displays, on the electric paper display unit, the identification information or synthesized information including the identification information and additional information. Further, an electric paper display module has a secure memory in which an option key for defining a process that is executable in a camera apparatus is stored.

Accordingly, a configuration in which camera identification information is displayed on an electric paper display unit such that the identification information can be confirmed during a power-off time, is implemented.

REFERENCE SIGNS LIST

10 . . . Camera apparatus, 11 . . . Plate attachment part, 12 . . . Camera identifier recording plate, 100 . . . Camera apparatus, 101 . . . Electric paper display unit, 110 . . . Camera control unit (CCU), 121 . . . Relay (HUB), 122 . . . Controller (remote controller), 123 . . . Monitor, 124 . . . Relay (wireless relay), 131 . . . Electric paper display unit (EPD: Electric Paper Display), 132 . . . Control unit (CPU), 133 . . . Memory (e.g., RAM, ROM), 134 . . . Storage unit (e.g., HD), 135 . . . Input unit, 136 . . . Input/output interface, 137 . . . Image processing unit, 138 . . . Communication unit, 141 . . . Image pickup unit, 142 . . . AD conversion unit, 143 . . . DSP (Digital Signal Processor), 150 . . . External memory, 200 . . . Camera apparatus, 201 . . . Electric paper module attachment slot, 210 . . . Electric paper display unit, 212 . . . Module control unit (CPU), 213 . . . Memory, 214 . . . Secure memory, 215 . . . Connection terminal, 11000 . . . Endoscopic surgery system, 11100 . . . Endoscope, 11101 . . . Lens barrel, 11102 . . . Camera head, 11110 . . . Surgical tool, 11111 . . . Pneumoperitoneum tube, 11112 . . . Energy device, 11120 . . . Supporting arm apparatus, 11200 . . . Cart, 11201 . . . Camera control unit (CCU), 11202 . . . Display apparatus, 11203 . . . Light source apparatus, 11204 . . . Inputting apparatus, 11205 . . . Treatment tool controlling apparatus, 11206 . . . Pneumoperitoneum apparatus, 11207 . . . Recorder, 11208 . . . Printer, 11401 . . . Lens unit, 11402 . . . Image pickup unit, 11403 . . . Driving unit, 11404 . . . Communication unit, 11405 . . . Camera head controlling unit, 11411 . . . Communication unit, 11412 . . . Image processing unit, 11413 . . . Control unit

The invention claimed is:

1. A display apparatus, comprising:
an electric paper display unit configured to display identification information associated with a camera of a plurality of cameras,
wherein the electric paper display unit is detachably connected to the camera; and
a control unit configured to control the display of the identification information based on a specific operation wherein the identification information displayed on the electric paper display unit irrespective of power supply to the electric paper display unit.

2. The display apparatus according to claim 1, wherein the specific operation comprises reception of one of an input of the identification information or designation information corresponding to the identification information via a communication unit from an external apparatus that communicates with the camera apparatus.

3. The display apparatus according to claim 1, wherein the specific operation comprises one of an input of the identification information or designation information corresponding to the identification information from an external memory attached to the camera.

4. The display apparatus according to claim 1, wherein the specific operation comprises reception of one of an input of the identification information or designation information corresponding to the identification information from an inner memory of the camera.

5. The display apparatus according to claim 1, wherein the control unit is further configured to control display, on the electric paper display unit, of synthesized information including the identification information and additional information.

6. The display apparatus according to claim 5, wherein the control unit is further configured to generate the synthesized information based on:
acquisition of the additional information from an inner memory of the camera, and
synthetization of the additional information and the identification information.

7. The display apparatus according to claim 5, wherein the additional information comprises at least one of a name of a company, a name of a user of the camera, an IP address unique to the camera, a process that is executable in the camera, or software information in the camera.

8. The display apparatus according to claim 5, wherein the control unit is further configured to control a display form of the synthesized information based on a user's operation or a specific condition.

9. The display apparatus according to claim 1, wherein
the display apparatus is configured as an electric paper module that is attachable to and detachable from the camera,
the electric paper module includes the electric paper display unit and a secure memory, and the secure memory is configured to store an option key including key data for allowing execution of a specific process in the camera.

10. The display apparatus according to claim 9, wherein the option key includes data that is necessary to define at least one of a permitted output data format of the camera, a permitted connection configuration of the camera, or a permitted execution function of the camera.

11. The display apparatus according to claim 9, wherein the electric paper module further includes a module control unit, and
the module control unit is configured to:
execute authentication of an apparatus having requested for an access to the secure memory, and
permit the access to the apparatus based on success of the authentication.

12. A camera apparatus, comprising:
an image pickup unit;
an electric paper display unit configured to display identification information associated with the camera apparatus,
wherein the electric paper display unit is detachably connected to the camera apparatus; and
a control unit configured to control the display of that displays the identification information based on a specific operation,
wherein the identification information is displayed on the electric paper display unit irrespective of power supply to the electric paper display unit.

13. The camera apparatus according to claim 12, wherein the specific operation comprises reception of one of an input of the identification information or designation information corresponding to the identification information from one of an external apparatus, an external memory, or an inner memory of the camera apparatus.

14. The camera apparatus according to claim 12, wherein the control unit is further configured to display, on the electric paper display unit, synthesized information including the identification information and additional information.

15. The camera apparatus according to claim 12, wherein the electric paper display unit is included in an electric paper module that is attachable to and detachable from the camera apparatus.

16. The camera apparatus according to claim 15, wherein the electric paper module includes the electric paper display unit and a secure memory, and
the secure memory is configured to store an option key that is necessary to define at least one of a permitted output data format of the camera apparatus, a permitted connection configuration of the camera apparatus, or a permitted execution function of the camera apparatus.

17. The camera apparatus according to claim 16, wherein the control unit is further configured to:
execute authentication of the electric paper module, and
grant, the electric paper module, an access to the secure memory, based on success of the authentication.

18. An identification information display method, the method comprising:
generating display information based on reception of an input of identification information associated with a camera of a plurality of cameras or designation information corresponding to the identification information; and
displaying the generated display information on an electric paper display unit, wherein
the electric paper display unit is detachably connected to the camera, and
the display information is displayed on the electric paper display unit irrespective of power supply to the electric paper display unit.

19. An information processing method, the method comprising:
executing, by a control unit of a camera apparatus, authentication of an electric paper module detachably connected to the camera apparatus,
wherein the electric paper module comprises an electric paper display unit;
acquiring, by the control unit, an option key from a secure memory of the electric paper module based on success of the authentication; and
executing, by the control unit, a process which permitted based on the acquisition of the option key.

20. A non-transitory computer-readable medium having stored thereon computer-executable instructions which, when executed by a processor, cause the processor to execute operations, the operations program comprising:
authenticating, by a control unit of a camera apparatus, an electric paper module detachably connected to the camera apparatus, wherein
the electric paper module comprises an electric paper display unit, and
the electric paper display unit displays identification information associated with the camera apparatus, and
the identification information is displayed on the electric paper display unit irrespective of power supply of the camera apparatus;
acquiring, by the control unit, an option key from a secure memory of the electric paper module based on success of the authentication; and
executing, by the control unit, a process that is permitted based on the acquisition of the option key.

* * * * *